(12) United States Patent
Belmar et al.

(10) Patent No.: US 8,478,922 B2
(45) Date of Patent: Jul. 2, 2013

(54) CONTROLLING A RATE AT WHICH ADAPTER INTERRUPTION REQUESTS ARE PROCESSED

(75) Inventors: Brenton F. Belmar, New Paltz, NY (US); David Craddock, New Paltz, NY (US); Janet R. Easton, Woodstock, NY (US); Mark S. Farrell, Pleasant Valley, NY (US); Thomas A. Gregg, Highland, NY (US); Damian L. Osisek, Vestal, NY (US); Donald W. Schmidt, Stone Ridge, NY (US); Gustav E. Sittmann, III, Webster Groves, MO (US); Richard P. Tarcza, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 12/821,179

(22) Filed: Jun. 23, 2010

(65) Prior Publication Data
US 2011/0320664 A1 Dec. 29, 2011

(51) Int. Cl.
*G06F 13/00* (2006.01)
(52) U.S. Cl.
USPC .......................................... 710/262; 710/260
(58) Field of Classification Search
USPC ................................. 710/260, 262
See application file for complete search history.

(56) References Cited

U.S. PATENT DOCUMENTS

| | | | |
|---|---|---|---|
| 4,028,668 A | 6/1977 | Riikonen | |
| 4,271,468 A | 6/1981 | Christensen et al. | |
| 4,323,963 A | 4/1982 | Wu | |
| 5,053,952 A | 10/1991 | Koopman, Jr. et al. | |
| 5,170,472 A | 12/1992 | Cwiakala et al. | |
| 5,265,240 A | 11/1993 | Galbraith et al. | |
| 5,282,274 A | 1/1994 | Liu | |
| 5,430,856 A | 7/1995 | Kinoshita | |
| 5,465,332 A | 11/1995 | Deloye et al. | |
| 5,465,355 A | 11/1995 | Cook et al. | |
| 5,535,352 A | 7/1996 | Bridges et al. | |
| 5,551,013 A | 8/1996 | Beausoleil et al. | |
| 5,574,873 A | 11/1996 | Davidian | |
| 5,586,268 A * | 12/1996 | Chen et al. ...................... | 710/38 |

(Continued)

FOREIGN PATENT DOCUMENTS

| | | |
|---|---|---|
| EP | 0076921 A2 | 4/1983 |
| EP | 0552873 A1 | 7/1993 |

(Continued)

OTHER PUBLICATIONS

U.S. Appl. No. 12/708,284, "Load Pair Disjoint Facility and Instruction Therefore," filed Jun. 24, 2010.

(Continued)

*Primary Examiner* — Glenn A Auve
(74) *Attorney, Agent, or Firm* — Dennis Jung, Esq.; Blanche E. Schiller, Esq.; Heslin Rothenberg Farley & Mesiti P.C.

(57) ABSTRACT

The conditions under which adapter interruptions are made pending are controlled. Responsive to an interruption being presented to an operating system, subsequent interruptions are suppressed on all central processing units in the configuration. The operating system processes the interruption, including examining and processing indicators of reported events until the operating system discontinues the suppression. This enables the operating system to control the number of pending interruptions and the number of processors processing those interruptions.

21 Claims, 28 Drawing Sheets

U.S. PATENT DOCUMENTS

| | | | |
|---|---|---|---|
| 5,600,805 A | 2/1997 | Fredericks et al. | |
| 5,617,554 A | 4/1997 | Alpert et al. | |
| 5,742,785 A | 4/1998 | Stone et al. | |
| 5,761,448 A | 6/1998 | Adamson et al. | |
| 5,790,825 A | 8/1998 | Traut | |
| 5,802,590 A | 9/1998 | Draves | |
| 5,822,616 A | 10/1998 | Hirooka | |
| 5,826,084 A | 10/1998 | Brooks et al. | |
| 5,838,960 A | 11/1998 | Harriman, Jr. | |
| 5,870,598 A | 2/1999 | White et al. | |
| 5,875,343 A | 2/1999 | Binford et al. | |
| 5,901,312 A | 5/1999 | Radko | |
| 5,960,213 A | 9/1999 | Wilson | |
| 5,974,440 A | 10/1999 | Brooks et al. | |
| 5,995,745 A * | 11/1999 | Yodaiken | 703/26 |
| 6,009,261 A | 12/1999 | Scalzi et al. | |
| 6,023,736 A | 2/2000 | Lambeth et al. | |
| 6,067,595 A | 5/2000 | Lindenstruth | |
| 6,078,970 A | 6/2000 | Nordstrom et al. | |
| 6,205,530 B1 | 3/2001 | Kang | |
| 6,308,255 B1 | 10/2001 | Gorishek, IV et al. | |
| 6,330,656 B1 | 12/2001 | Bealkowski et al. | |
| 6,349,380 B1 | 2/2002 | Shahidzadeh et al. | |
| 6,397,350 B1 | 5/2002 | Baskey et al. | |
| 6,408,347 B1 | 6/2002 | Smith et al. | |
| 6,463,582 B1 | 10/2002 | Lethin et al. | |
| 6,493,741 B1 | 12/2002 | Emer et al. | |
| 6,519,645 B2 | 2/2003 | Markos et al. | |
| 6,529,978 B1 | 3/2003 | Eide et al. | |
| 6,557,035 B1 | 4/2003 | McKnight | |
| 6,578,191 B1 | 6/2003 | Boehme et al. | |
| 6,615,305 B1 | 9/2003 | Olesen et al. | |
| 6,629,175 B1 | 9/2003 | Manning et al. | |
| 6,654,818 B1 | 11/2003 | Thurber | |
| 6,658,521 B1 | 12/2003 | Biran et al. | |
| 6,704,831 B1 | 3/2004 | Avery | |
| 6,721,839 B1 | 4/2004 | Bauman et al. | |
| 6,772,264 B1 | 8/2004 | Dayan et al. | |
| 6,792,492 B1 | 9/2004 | Griffin | |
| 6,820,164 B2 | 11/2004 | Holm et al. | |
| 6,901,537 B2 | 5/2005 | Dawkins et al. | |
| 6,907,510 B2 | 6/2005 | Bennett et al. | |
| 6,963,940 B1 | 11/2005 | Glassen et al. | |
| 6,968,446 B1 | 11/2005 | McGrath | |
| 6,970,992 B2 | 11/2005 | Gurumoorthy et al. | |
| 6,978,338 B2 | 12/2005 | Wang et al. | |
| 6,996,638 B2 | 2/2006 | Brice, Jr. et al. | |
| 7,065,598 B2 | 6/2006 | Connor et al. | |
| 7,107,384 B1 | 9/2006 | Chen et al. | |
| 7,127,599 B2 | 10/2006 | Brice, Jr. et al. | |
| 7,130,938 B2 | 10/2006 | Brice, Jr. et al. | |
| 7,139,940 B2 | 11/2006 | Arbeitman et al. | |
| 7,174,550 B2 | 2/2007 | Brice, Jr. et al. | |
| 7,177,961 B2 | 2/2007 | Brice, Jr. et al. | |
| 7,200,704 B2 | 4/2007 | Njoku et al. | |
| 7,209,994 B1 | 4/2007 | Klaiber et al. | |
| 7,260,664 B2 | 8/2007 | Arndt et al. | |
| 7,277,968 B2 | 10/2007 | Brice, Jr. et al. | |
| 7,296,120 B2 | 11/2007 | Corrigan et al. | |
| 7,302,692 B2 | 11/2007 | Bae et al. | |
| 7,328,296 B1 | 2/2008 | Marmash et al. | |
| 7,334,107 B2 | 2/2008 | Schoinas et al. | |
| 7,340,582 B2 | 3/2008 | Madukkarumukumana | |
| 7,380,041 B2 | 5/2008 | Belmar et al. | |
| 7,398,343 B1 | 7/2008 | Marmash et al. | |
| 7,412,488 B2 | 8/2008 | Jha et al. | |
| 7,418,572 B2 | 8/2008 | Hepkin | |
| 7,420,931 B2 | 9/2008 | Nanda et al. | |
| 7,444,493 B2 | 10/2008 | Schoinas et al. | |
| 7,454,548 B2 | 11/2008 | Belmar et al. | |
| 7,464,191 B2 | 12/2008 | Arndt et al. | |
| 7,464,209 B2 | 12/2008 | Armstrong et al. | |
| 7,475,183 B2 | 1/2009 | Traut et al. | |
| 7,493,425 B2 | 2/2009 | Arndt et al. | |
| 7,496,706 B2 | 2/2009 | Nguyen et al. | |
| 7,496,707 B2 | 2/2009 | Freking et al. | |
| 7,506,087 B2 | 3/2009 | Ho et al. | |
| 7,509,391 B1 | 3/2009 | Chauvel et al. | |
| 7,516,252 B2 | 4/2009 | Krithivas | |
| 7,526,592 B2 | 4/2009 | Tsuruta | |
| 7,529,860 B2 | 5/2009 | Freimuth et al. | |
| 7,530,071 B2 | 5/2009 | Billau et al. | |
| 7,546,406 B2 | 6/2009 | Armstrong et al. | |
| 7,546,487 B2 | 6/2009 | Marisetty et al. | |
| 7,549,090 B2 | 6/2009 | Bailey et al. | |
| 7,552,298 B2 | 6/2009 | Bestler | |
| 7,562,366 B2 | 7/2009 | Pope et al. | |
| 7,567,567 B2 | 7/2009 | Muller et al. | |
| 7,587,531 B2 | 9/2009 | Brice, Jr. et al. | |
| 7,600,053 B2 | 10/2009 | Carlson et al. | |
| 7,606,965 B2 | 10/2009 | Njoku et al. | |
| 7,613,847 B2 | 11/2009 | Kjos et al. | |
| 7,617,340 B2 | 11/2009 | Gregg | |
| 7,617,345 B2 | 11/2009 | Clark et al. | |
| 7,624,235 B2 | 11/2009 | Wadhawan et al. | |
| 7,627,723 B1 | 12/2009 | Buck et al. | |
| 7,631,097 B2 | 12/2009 | Moch et al. | |
| 7,886,086 B2 | 2/2011 | Sharma et al. | |
| 8,112,556 B2 | 2/2012 | Hanson et al. | |
| 2002/0152334 A1 | 10/2002 | Holm et al. | |
| 2003/0056155 A1 | 3/2003 | Austen et al. | |
| 2003/0074541 A1 | 4/2003 | Plambeck | |
| 2004/0025166 A1 | 2/2004 | Adlung et al. | |
| 2004/0064618 A1 | 4/2004 | Farrell et al. | |
| 2004/0073905 A1 | 4/2004 | Emer et al. | |
| 2004/0093452 A1 | 5/2004 | Easton et al. | |
| 2004/0117534 A1 | 6/2004 | Parry et al. | |
| 2004/0139304 A1 | 7/2004 | Arimilli et al. | |
| 2004/0199700 A1 | 10/2004 | Clayton | |
| 2004/0236880 A1 | 11/2004 | Barrett | |
| 2005/0033895 A1 | 2/2005 | Lueck et al. | |
| 2005/0071472 A1 | 3/2005 | Arndt et al. | |
| 2005/0114586 A1 | 5/2005 | Brice, Jr. et al. | |
| 2005/0114623 A1 | 5/2005 | Craddock et al. | |
| 2005/0289271 A1 | 12/2005 | Martinez et al. | |
| 2006/0005083 A1 | 1/2006 | Genden et al. | |
| 2006/0101181 A1 | 5/2006 | Post et al. | |
| 2006/0130071 A1 | 6/2006 | Martin et al. | |
| 2006/0195617 A1 | 8/2006 | Arndt et al. | |
| 2006/0195644 A1 | 8/2006 | Arndt et al. | |
| 2006/0230208 A1 | 10/2006 | Gregg et al. | |
| 2006/0253619 A1 | 11/2006 | Torudbakken et al. | |
| 2006/0281630 A1 | 12/2006 | Bailey et al. | |
| 2006/0288130 A1 | 12/2006 | Madukkarumukumana | |
| 2007/0028087 A1 | 2/2007 | Yu et al. | |
| 2007/0073955 A1 | 3/2007 | Murray et al. | |
| 2007/0136554 A1 | 6/2007 | Biran et al. | |
| 2007/0168636 A1 | 7/2007 | Hummel et al. | |
| 2007/0168643 A1 | 7/2007 | Hummel et al. | |
| 2007/0168644 A1 | 7/2007 | Hummel et al. | |
| 2007/0168934 A1 | 7/2007 | Chandrasekharan et al. | |
| 2007/0186074 A1 | 8/2007 | Bradford et al. | |
| 2007/0226386 A1 | 9/2007 | Sharp et al. | |
| 2007/0234018 A1 | 10/2007 | Feiste | |
| 2007/0245041 A1 | 10/2007 | Hua et al. | |
| 2007/0260768 A1 | 11/2007 | Bender et al. | |
| 2007/0271559 A1 | 11/2007 | Easton et al. | |
| 2008/0091851 A1 | 4/2008 | Sierra | |
| 2008/0091868 A1 | 4/2008 | Mizrachi et al. | |
| 2008/0091915 A1 | 4/2008 | Moertl et al. | |
| 2008/0114734 A1 | 5/2008 | Suwabe | |
| 2008/0114906 A1 | 5/2008 | Hummel et al. | |
| 2008/0126648 A1 | 5/2008 | Brownlow et al. | |
| 2008/0126652 A1 | 5/2008 | Vembu et al. | |
| 2008/0148295 A1 | 6/2008 | Freimuth et al. | |
| 2008/0168208 A1 | 7/2008 | Gregg | |
| 2008/0222406 A1 | 9/2008 | Tabuchi | |
| 2008/0235425 A1 | 9/2008 | Belmar et al. | |
| 2009/0024823 A1 | 1/2009 | Ko et al. | |
| 2009/0049220 A1 | 2/2009 | Conti et al. | |
| 2009/0070760 A1 | 3/2009 | Khatri et al. | |
| 2009/0089780 A1 | 4/2009 | Johnson et al. | |
| 2009/0125666 A1 | 5/2009 | Freking et al. | |
| 2009/0144462 A1 | 6/2009 | Arndt et al. | |
| 2009/0172211 A1 | 7/2009 | Perry et al. | |
| 2009/0182966 A1 | 7/2009 | Greiner et al. | |
| 2009/0182969 A1 | 7/2009 | Norgaard et al. | |

| | | | |
|---|---|---|---|
| 2009/0210646 A1 | 8/2009 | Bauman et al. | |
| 2009/0222814 A1 | 9/2009 | Astrand | |
| 2009/0240849 A1 | 9/2009 | Corneli et al. | |
| 2009/0249039 A1 | 10/2009 | Hook et al. | |
| 2009/0276774 A1 | 11/2009 | Kinoshita | |
| 2009/0328035 A1 | 12/2009 | Ganguly | |
| 2010/0005234 A1 | 1/2010 | Ganga et al. | |
| 2010/0082855 A1 | 4/2010 | Accapadi et al. | |
| 2010/0169528 A1 | 7/2010 | Kumar et al. | |
| 2011/0153893 A1 | 6/2011 | Foong et al. | |
| 2011/0321061 A1 | 12/2011 | Craddock et al. | |

FOREIGN PATENT DOCUMENTS

| | | |
|---|---|---|
| EP | 0902355 A2 | 3/1999 |
| EP | 0955585 A2 | 11/1999 |
| EP | 1096376 A2 | 2/2001 |
| EP | 1489491 A1 | 12/2004 |
| JP | 57191826 A | 11/1982 |
| JP | 359081724 A | 5/1984 |
| JP | 362079557 A | 4/1987 |
| JP | 405053973 A | 3/1993 |
| JP | 510996 A | 4/1993 |
| WO | WO9600940 A1 | 6/1995 |
| WO | WO9938074 A1 | 7/1999 |
| WO | WO 02/41157 A2 | 5/2002 |

OTHER PUBLICATIONS

U.S. Appl. No. 12/820,735, "High-Word Facility for Extending the Number of General Purpose Registers Available to Instructions," filed Jun. 22, 2010.

U.S. Appl. No. 12/820,768, "Instructions for Performing an Operation on Two Operands and Subsequently Storing an Original Value of Operand," filed Jun. 22, 2010.

U.S. Appl. No. 12/821,224, "Associating Input/Output Device Requests With Memory Associated With a Logical Partition," filed Jun. 21, 2010.

U.S. Appl. No. 12/821,239, "Input/Output (I/O) Expansion Response Processing in a Peripheral Component Interconnect Express (PCIE) Environment," filed Jun. 23, 2010.

U.S. Appl. No. 12/821,242, "A System and Method for Downbound I/O Expansion Request and Response Processing in a PCIe Architecture," filed Jun. 23, 2010.

U.S. Appl. No. 12/821,243, "Upbound Input/Output Expansion Request and Response Processing in a PCIE Architecture," filed Jun. 23, 2010.

U.S. Appl. No. 12/821,245, "A System and Method for Routing I/O Expansion Requests and Responses in a PCIE Architecture," filed Jun. 23, 2010.

U.S. Appl. No. 12/821,247, "Scalable I/O Adapter Function Level Error Detection, Isolation, and Reporting," filed Jun. 23, 2010.

U.S. Appl. No. 12/821,248, "Connected Input/Output HUB Management," filed Jun. 23, 2010.

U.S. Appl. No. 12/821,256, "Switch Failover Control in a Multiprocessor Computer System," filed Jun. 23, 2010.

U.S. Appl. No. 12/821,271, "Memory Error Isolation and Recovery in a Multiprocessor Computer System," filed Jun. 23, 2010.

U.S. Appl. No. 12/822,358, "Function Virtualization Facility for Function Query of a Processor," filed Jun. 24, 2010.

U.S. Appl. No. 12/822,368, "Function Virtualization Facility for Blocking Instruction Function of a Multi-Function Instruction of a Virtual Processor," filed Jun. 24, 2010.

Craddock et al., U.S. Appl. No. 12/821,170, "Translation of Input/Output Address to Memory Addresses" filed Jun. 23, 2010.

Craddock et al., U.S. Appl. No. 12/821,171, "Runtime Determination of Translation Formats for Adapter Functions," filed Jun. 23, 2010.

Craddock et al., U.S. Appl. No. 12/821,172, "Resizing Address Spaces Concurrent to Accessing the Address Spaces," filed Jun. 23, 2010.

Craddock et al., U.S. Appl. No. 12/821,174, "Multiple Address Spaces Per Adapter," filed Jun. 23, 2010.

Craddock et al., U.S. Appl. No. 12/821,175, "Converting a Message Signaled Interruption Into an I/O Adapter Event Notification," filed Jun. 23, 2010.

Brice et al., U.S. Appl. No. 12/821,177, "Converting a Message Signaled Interruption Into an I/O Adapter Event Notification to a Guest Operating System," filed Jun. 23, 2010.

Craddock et al., U.S. Appl. No. 12/821,178, "Identification of Types of Sources of Adapter Interruptions," filed Jun. 23, 2010.

Craddock et al., U.S. Appl. No. 12/821,181, "Controlling the Selectively Setting of Operational Parameters for an Adapter," filed Jun. 23, 2010.

Craddock et al., U.S. Appl. No. 12/821,182, "Load Instruction for Communicating With Adapters," filed Jun. 23, 2010.

Craddock et al., U.S. Appl. No. 12/821,184, "Controlling Access by a Configuration to an Adapter Function," filed Jun. 23, 2010.

Coneski et al., U.S. Appl. No. 12/821,185, "Discovery by Operating System of Information Relating to Adapter Functions Accessible to the Operating System," filed Jun. 23, 2010.

Coneski et al., U.S. Appl. No. 12/821,187, "Enable/Disable Adapters of a Computing Environment," filed Jun. 23, 2010.

Craddock et al., U.S. Appl. No. 12/821,190, "Guest Access to Address Spaces of Adapter," filed Jun. 23, 2010.

Coneski et al., U.S. Appl. No. 12/821,191, "Managing Processing Associated With Hardware Events," filed Jun. 23, 2010.

Craddock et al., U.S. Appl. No. 12/821,192, "Operating System Notification of Actions to Be Taken Responsive to Adapter Events," filed Jun. 23, 2010.

Brice et al., U.S. Appl. No. 12/821,193, "Measurement Facility for Adapter Functions," filed Jun. 23, 2010.

Craddock et al., U.S. Appl. No. 12/821,194, "Store/Store Block Instructions for Communicating With Adapters," filed Jun. 23, 2010.

International Search Report and Written Opinion for PCT/EP2010/067039 dated Feb. 25, 2011.

International Search Report and Written Opinion for PCT/EP2010/067036 dated Feb. 14, 2011.

International Search Report and Written Opinion for PCT/EP2010/067030 dated Feb. 7, 2011.

International Search Report and Written Opinion for PCT/EP2010/067020 dated Apr. 5, 2011.

International Search Report and Written Opinion for PCT/EP2010/067025 dated Apr. 13, 2011.

International Search Report and Written Opinion for PCT/EP2010/067024 dated Apr. 27, 2011.

International Search Report and Written Opinion for PCT/EP2010/067019 dated Apr. 26, 2011.

International Search Report and Written Opinion for PCT/EP2010/067021 dated Apr. 28, 2011.

International Search Report and Written Opinion for PCT/EP2010/067043 dated Apr. 21, 2011.

International Search Report and Written Opinion for PCT/EP2010/067041 dated Apr. 26, 2011.

International Search Report and Written Opinion for PCT/EP2010/067031 dated Apr. 26, 2011.

International Search Report and Written Opinion for PCT/EP2010/067034 dated May 18, 2011.

International Search Report and Written Opinion for PCT/EP2010/067023 dated Jun. 15, 2011.

International Search Report and Written Opinion for PCT/EP2010/067032 dated May 27, 2011.

International Search Report and Written Opinion for PCT/EP2010/067038 dated Jun. 15, 2011.

"Chapter 6: Configuration Space" in PCI-SIG: "PCI Local Bus Specification Revision 3.0", Feb. 2004, pp. 213-254.

Rennet, P. et al., "Programmable Interrupt Vectors in Processors," IBM Technical Disclosure Bulletin, vol. 25, No. 5, Oct. 1, 1982, pp. 2641-2642.

Plambeck et al., "Development and Attributes of z/Architecture," IBM Journal of Research and Development, IBM Corporation, vol. 46, No. 4/05, Jul. 1, 2002, pp. 367-379.

"z/Architecture Principles of Operation, Chapter 3", Feb. 2008, pp. 1-71.

Gehringer, E. F., et al., "Virtual Memory Systems," CSC-506—Architecture of Parallel Computers Computer Science Department, College of Engineering, North Carolina, Dec. 31, 1999, XP002631523.

"z/Architecture—Principles of Operation," IBM Publication No. SA22-7832-05, Sixth Edition, Apr. 2007, Chapter 10, 10-1-10-138.

McGee, H.T., "Technique for Resetting a Single Channel Path Under Operator Control in IBM System/370XA," IBM Technical Disclosure Bulletin, vol. 26, No. 10B, Mar. 1984.

"Decreased Latency Across PCI Express With I/O Virtualization Via a Hint Interface," IPCOM000185226D, Jul. 16, 2009, pp. 1-2.

Office Action for U.S. Appl. No. 12/821,184 dated Oct. 18, 2011.

Office Action for U.S. Appl. No. 12/821,185 dated Dec. 20, 2011.

Paulsen, Eric; "Local Memory Coaxes Top Speed from SCSI Masters," Electronic Design, v. 41, Apr. 15, 1993, pp. 76-6+.

Ganapathy, Narayanan; "General Purpose Operating System Support for Multiple Page Sizes," USENIX Annual Technical Conference (No. 98), 1998, pp. 91-104.

Talluri et al., "A New Page Table for 64-bit Address Spaces," ACM SIGOPS Operating Systems Review, vol. 29, Issue 5 (Dec. 1995), pp. 194-200.

"Large Page Support in the Linux Kernel," http://lwn.net/Articles/6969/ <retrieved on Jan. 26, 2010>.

Crawford, Catherine H. et al., "Accelerating Computing with the Cell Broadband Engine Processor," May 2008, CF '08, May 5-7, 2008, Ischia, Italy, pp. 3-11.

Baumann, Andrew, et al., "The Multikernel: A New OS Architecture for Scalable Multicore Systems," Oct. 2009, SOSP '09, Oct. 11-14, 2009, Big Sky, Montana, USA, pp. 29-43.

Swift, Michael M. et al., "Improving the Reliability of Commodity Operating Systems," ACM Transactions on Computer Systems, vol. 23, No. 1, Feb. 2005, pp. 77-110.

Xu, Min et al., "Towards a VMM-based Usage Control Framework for OS Kernel Integrity Protection," SACMAT '07, Jun. 20-22, 2007, Sophia Antipolis, France, pp. 71-80.

Huang, Wei et al., "A Case for High Performance Computing with Virtual Machines," ISC '06, Jun3 28 30, Carins, Queensland, Australia, pp. 125-134, Jun. 3, 2006.

Mysore, Shashidhar et al., "Understanding and Visualizing Full Systems with Data Flow Tomography," SPOLOS '08, Mar. 1-5, 2008, Seattle, Washington, USA, pp. 211-221.

"DMA Engines Bring Multicast to PCI Express Systems," http://electronicdesign.com, Aug. 13, 2009, 3 pages.

"Xen Wiki," http://wiki.xensource.com/xenwiki/VTTdHowTo, 5 pages, Apr. 16, 2010.

Vaidyanathan, K., et al., "Exploiting RDMA Operations for Providing Efficient Fine-Grained Resource Monitoring in Cluster-based Servers," 1-4244-0328—Jun. 2006, 10 pages.

"IBM Enhances the IBM eServer zSeries 990 Family of Servers," Hardware Announcement, Oct. 7, 2003, pp. 1-11.

"Intel® Virtualization Technology for Directed I/O," Intel® Technology Journal, vol. 10, Issue 3, Aug. 10, 2006.

"I/O Virtualization and AMD's IOMMU," AMD Developer Central, http://developer.amd.com/documentation/articles/pages/892006101.aspx, Aug. 9, 2006.

"z/Architecture Principles of Operation," IBM Publication No. SA22-7832-07, Feb. 2009.

"z/VM: Running Guest Operating Systems," IBM Publication No. SC24-5997-02, Oct. 2001.

"z/VM: General Information Manual," IBM Publication No. GC24-5991-05, May 2003.

Winwood, Simon, et al., "Multiple Page Size Support in the Linux Kernel", Proceedings of Ottawa Linux Symposium, 2002.

"z/Architecture Principles of Operation," Chapter 17, pp. 17-1-17-30, IBM Publication No. SA22-7832-07, Feb. 2009.

"Intel® Itanium® Architecture Software Developer's Manual," vol. 2, Rev. 2.2, Jan. 2006.

Final Office Action for U.S. Appl. No. 12/821,184 dated Jan. 24, 2012.

Office Action for U.S. Appl. No. 12/821,187 dated Feb. 28, 2012.

Office Action for U.S. Appl. No. 12/821,177 dated May 2, 2012.

Final Office Action for U.S. Appl. No. 12/821,185 dated Jun. 6, 2012.

"Atari PCI BIOS and Device Drive Specification 1.13," Chapters 2, 3, 4 and 6; [online], internet archive dates Dec. 12, 2007 and Feb. 8, 2007; retrieved on May 24, 2012, 13 pages <URL:http://kunden.wvnet.at/fichti/docs/pcibios-2.htm; pcibios-3.htm; pcibios-4.htm, pcibios-6.htm>.

"PCI Device Access Under 32-bit PM DOS from Open Watcom," [online], internet archive date Jul. 19, 2006; retrieved May 26, 2012, 14 pages <URL:http://www.openwatcom.org/index.php/PCI_Device_access_under_32-Bit_PM_DOS>.

Device Identification Strings from OSR online; [online], internet archive date Mar. 13, 2005; retrieved May 26, 2012, 3 pages <URL:http//www.osronline.com/ddkx/install/idstrings_8tt3.htm>.

Office Action for U.S. Appl. No. 12/821,190 dated Jun. 12, 2012.

Final Office Action for U.S. Appl. No. 12/821,187 dated Jul. 16, 2012.

Office Action for U.S. Appl. No. 12/821,178 dated Jul. 17, 2012.

Office Action for U.S. Appl. No. 13/462,152 dated Aug. 28, 2012.

Office Action for U.S. Appl. No. 12/821,175 dated Sep. 17, 2012.

International Search Report and Written Opinion for PCT/EP2010/067029 dated Mar. 2, 2011.

"IBM System/390 I/O Call Reporting Process," IBM Technical Disclosure Bulletin, vol. 36, No. 1, Jan. 1993, pp. 164-169, XP000222812.

"Means for Channel Subsystem-Initiated Communication," IBM Technical Disclosure Bulletin, vol. 33, No. 12, May 1991, p. 169, XP000121623.

International Search Report and Written Opinion for PCT/EP2010/067028 dated Mar. 8, 2011.

International Search Report and Written Opinion for PCT/EP2010/067042 dated Apr. 28, 2011.

Communication Pursuant to Article 94(3) EPC for Application No. 10 776 350.0-2212 dated Oct. 31, 2012.

Communication Pursuant to Article 94(3) EPC for Application No. 10 784 272.6-1243 dated Feb. 6, 2013.

Office Action for U.S. Appl. No. 12/821,181 dated Mar. 26, 2013, pp. 1-37.

Notice of Allowance for U.S. Appl. No. 12/821,185 dated Apr. 11, 2013, pp. 1-16.

* cited by examiner

CONTROLLING A RATE AT WHICH ADAPTER INTERRUPTION REQUESTS ARE PROCESSED

BACKGROUND

This invention relates, in general, to interruption processing within a computing environment, and in particular, to controlling processing of interruption requests generated from adapters of the computing environment.

In some computing environments, such as those based on the z/Architecture® offered by International Business Machines Corporation, Armonk, N.Y., interruptions requested by input/output (I/O) adapters are assigned to interruption subclasses. These subclasses are used, for instance, in prioritizing the interruptions for processing by an operating system of a processor.

In order for a processor of the computing environment to process the interruptions of an interruption subclass (ISC), the processor is to be enabled for that subclass. When enabled, it may process the interruptions of that subclass, but not of other subclasses for which it is not enabled. Multiple processors may be enabled for a subclass, and therefore, multiple processors may be concurrently processing interrupts for a given subclass.

BRIEF SUMMARY

In accordance with an aspect of the present invention, a capability is provided to control how many processors are concurrently processing interrupts for a given interrupt subclass, and/or to control the rate at which interrupts are being processed.

The shortcomings of the prior art are overcome and advantages are provided through the provision of a computer program product for controlling interrupt processing in a multiple processor computing environment. The computer program product includes a computer readable storage medium readable by a processing circuit and storing instructions for execution by the processing circuit for performing a method. The method includes, for instance, determining that a first pending indicator has been set indicating an interrupt request by an adapter of the computing environment; presenting the interrupt request to an operating system, the operating system to process one or more set event indicators corresponding to the interrupt request and one or more other set event indicators corresponding to one or more other interrupt requests; resetting, in response to the presenting, the first pending indicator indicating to one or more processors that an interrupt request is not pending, wherein a second pending indicator remains set to suppress other interrupt requests from being made pending; determining that the first pending indicator has been set indicating another interrupt request has been made pending, the first pending indicator set responsive to a determination that at least one other interruption request is not to be suppressed, this determination responsive to at least one of an indication that event indicators set responsive to other interrupt requests are not being processed timely or an indication that event indicators set responsive to other interruptions requests have been processed; and presenting the another interrupt request to the operating system.

In a further aspect of the present invention, a computer program product for controlling interrupt processing in a computing environment is provided. The computer program product includes a computer readable storage medium readable by a processing circuit and storing instructions for execution by the processing circuit for performing a method. The method includes, for instance, presenting an interruption request by an adapter of the computing environment to an operating system, the operating system to process one or more set event indicators corresponding to the interrupt request, and wherein an interruptions mode set for the adapter is a single interruptions mode; and responsive to the presenting, automatically changing the interruptions mode set for the adapter to a no interruptions mode, wherein another interrupt request is not presented to the operating system but event indicators for one or more other interrupt requests are set to be processed by the operating system.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
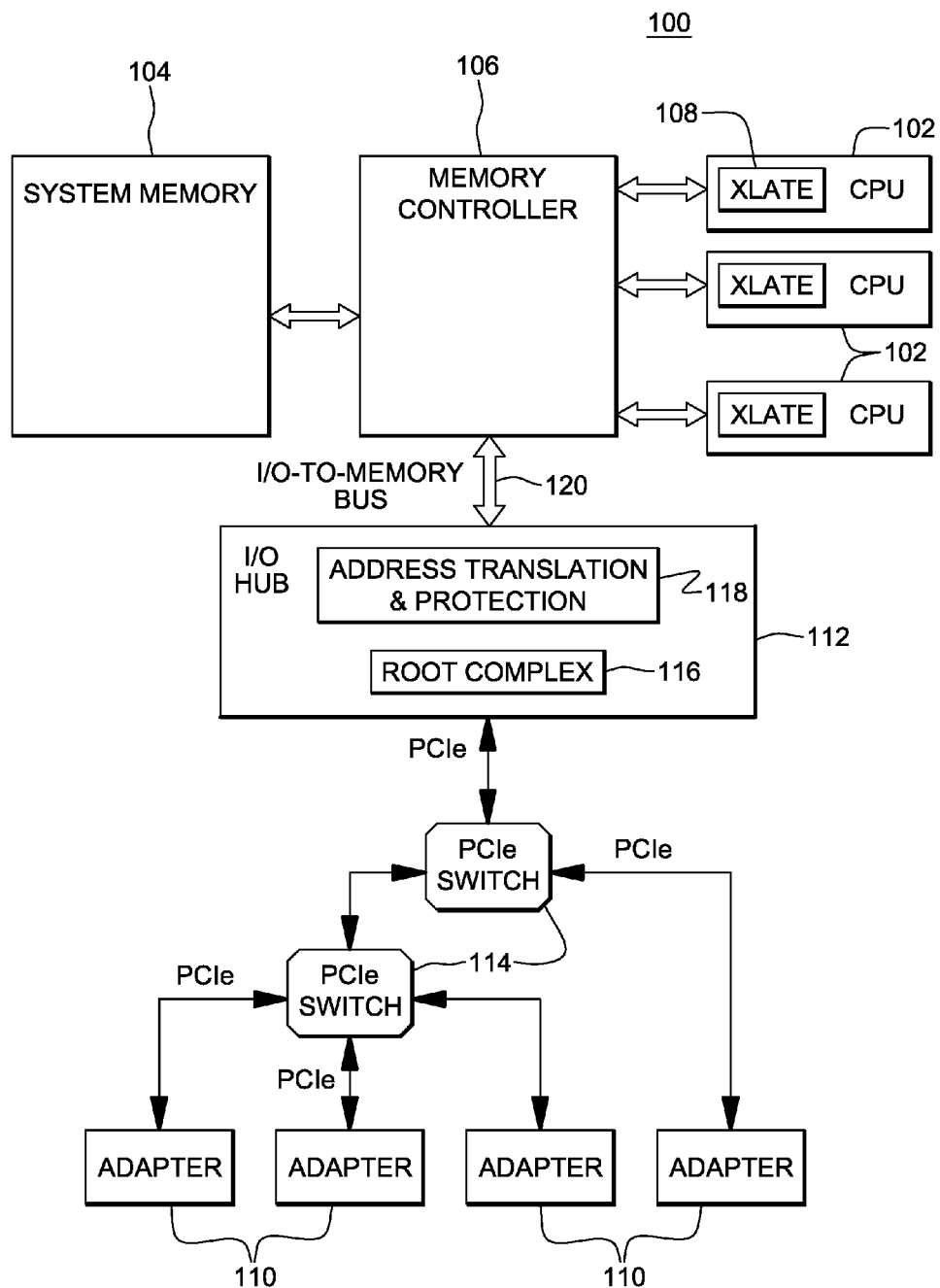
FIG. 1A depicts one embodiment of a computing environment to incorporate and use one or more aspects of the present invention.

In accordance with an aspect of the present invention, a capability is provided to control a rate at which interruption requests are processed. This control includes managing the number of processors to perform interrupt processing.

To request an interrupt, in one example, an adapter issues a message signaled interruption (MSI) request. The MSI request is then converted into an input/output (I/O) adapter event notification, in which one or more specific indicators are set and a request is made to present an interruption to an operating system (or other software, such as other programs, etc). As used herein, the term operating system includes operating system device drivers.

In one embodiment, multiple interruption requests (e.g., MSIs) from one or more adapters are coalesced into a single interruption to the operating system, but with respective indicators set. For instance, if the I/O hub has already received an MSI request, has in turn, provided an interruption request to a CPU, and that interruption is still pending, then if the hub receives one or more other MSIs, the CPU does not present an additional interruption. The one interruption replaces and represents the plurality of MSI requests. However, one or more indicators associated with each additional request are still set.

Responsive to presenting the interruption to the operating system, another interruption may be presented. This interruption may be handled by either the same CPU or another CPU. Thus, there may be multiple requests being handled concurrently by multiple CPUs.

In accordance with an aspect of the present invention, a control is provided to throttle the delivery of adapter interruption requests from adapter functions. For instance, responsive to an adapter interruption being presented to the operating system, other interruptions are suppressed, but indicators are set responsive to those suppressed interruptions. Suppression is continued until, for instance, the operating system determines, if at all, that additional processors (e.g., CPUs) are needed in processing the indicators (e.g., the rate of adapter interruptions exceeds a predefined threshold). Alternatively, if all the indicators have been processed and the operating system has completed its event handling, the operating system may determine that suppression is no longer needed. At such a point, further interruptions are allowed once again.

As used herein, the term "adapter" includes any type of adapter (e.g., storage adapter, network adapter, processing adapter, cryptographic adapter, PCI adapter, other type of input/output adapter, etc.). In one embodiment, an adapter includes one adapter function. However, in other embodiments, an adapter may include a plurality of adapter functions. One or more aspects of the present invention are applicable whether an adapter includes one adapter function or a plurality of adapter functions. Further, in the examples presented herein, adapter is used interchangeably with adapter function (e.g., PCI function) unless otherwise noted.

One embodiment of a computing environment to incorporate and use one or more aspects of the present invention is described with reference to FIG. 1. In one example, a computing environment 100 is a System z® server offered by International Business Machines Corporation. System z® is based on the z/Architecture® offered by International Business Machines Corporation. Details regarding the z/Architecture® are described in an IBM® publication entitled, "z/Architecture Principles of Operation," IBM Publication No. SA22-7832-07, February 2009, which is hereby incorporated herein by reference in its entirety. IBM®, System z® and z/Architecture® are registered trademarks of International Business Machines Corporation, Armonk, N.Y. Other names used herein may be registered trademarks, trademarks or product names of International Business Machines Corporation or other companies.

In one example, computing environment 100 includes one or more central processing units (CPUs) 102 coupled to a system memory 104 (a.k.a., main memory) via a memory controller 106. To access system memory 104, a central processing unit 102 issues a read or write request that includes an address used to access system memory. The address included in the request is typically not directly usable to access system memory, and therefore, it is translated to an address that is directly usable in accessing system memory. The address is translated via a translation mechanism (XLATE) 108. For example, the address is translated from a virtual address to a real or absolute address using, for instance, dynamic address translation (DAT).

The request, including the address (translated, if necessary), is received by memory controller 106. In one example, memory controller 106 is comprised of hardware and is used to arbitrate for access to the system memory and to maintain the memory's consistency. This arbitration is performed for requests received from CPUs 102, as well as for requests received from one or more adapters 110. Like the central processing units, the adapters issue requests to system memory 104 to gain access to the system memory.

In one example, adapter 110 is a Peripheral Component Interconnect (PCI) or PCI Express (PCIe) adapter that includes one or more PCI functions. A PCI function issues a request that is routed to an input/output hub 112 (e.g., a PCI hub) via one or more switches (e.g., PCIe switches) 114. In one example, the input/output hub is comprised of hardware, including one or more state machines.

The input/output hub includes, for instance, a root complex 116 that receives the request from a switch. The request includes an input/output address that is used to perform a direct memory access (DMA) or to request a message signaled interruption (MSI), as examples. This address is provided to an address translation and protection unit 118 which accesses information used for either the DMA or the MSI request.

For a DMA operation, address translation and protection unit 118 may translate the address to an address usable to access system memory. Then, the request initiated from the adapter, including the translated address, is provided to memory controller 106 via, for instance, an I/O-to-memory bus 120. The memory controller performs its arbitration and forwards the request with the translated address to the system memory at the appropriate time.

For an MSI request, information in address translation and protection unit 118 is obtained to facilitate conversion of the MSI request to an I/O adapter event notification, as described herein.

Figure 1B:
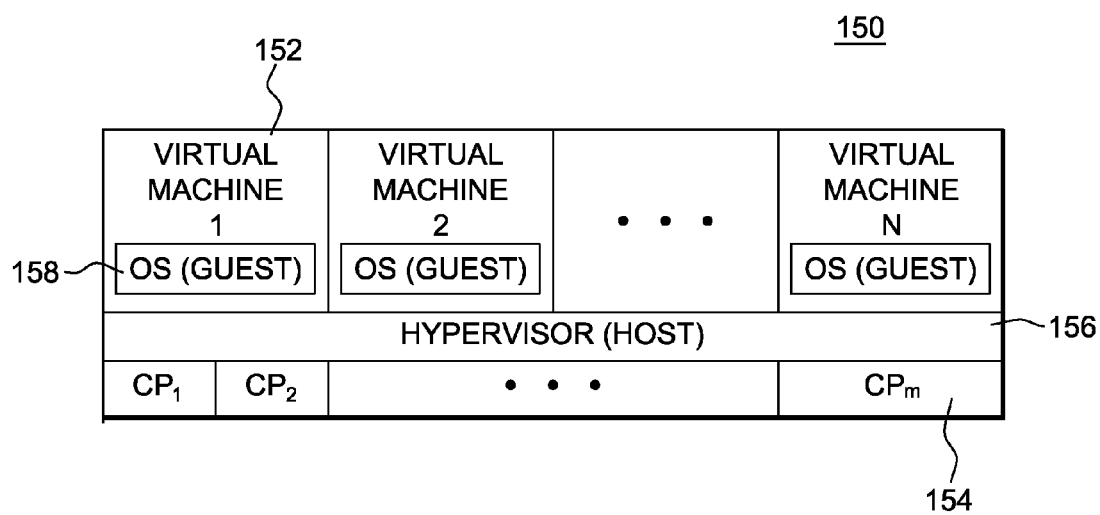
FIG. 1B depicts one embodiment of a central processing complex in which a host is executing one or more guests, in accordance with an aspect of the present invention.

In a further embodiment, in addition to or instead of one or more of central processing units 102, a central processing complex, such as the one shown in FIG. 1B, is coupled to memory controller 106. In this particular example, central processing complex 150 provides virtual machine support. Central processing complex 150 includes, for instance, one or more virtual machines 152, one or more central processors 154, and at least one hypervisor 156, each of which is described below.

The virtual machine support of the central processing complex provides the ability to operate large numbers of virtual machines, each capable of executing a guest operating system 158, such as z/Linux. Each virtual machine 152 is capable of functioning as a separate system. That is, each virtual machine can be independently reset, execute a guest operating system, and operate with different programs. An operating system or application program running in a virtual machine appears to have access to a full and complete system, but in reality, only a portion of it may be available.

In this particular example, the model of virtual machines is a V=V model, in which the memory of a virtual machine is backed by virtual memory, instead of real memory. Each virtual machine has a virtual linear memory space. The physical resources are owned by hypervisor 156, such as a VM hypervisor, and the shared physical resources are dispatched by the hypervisor to the guest operating systems, as needed, to meet their processing demands. This V=V virtual machine model assumes that the interactions between the guest operating systems and the physical shared machine resources are controlled by the VM hypervisor, since the large number of guests typically precludes the hypervisor from simply partitioning and assigning the hardware resources to the configured guest. One or more aspects of a V=V model are further described in an IBM publication entitled "z/VM: Running Guest Operating Systems," IBM Publication No. SC24-5997-02, October 2001, which is hereby incorporated herein by reference in its entirety.

Central processors 154 are physical processor resources that are assignable to a virtual machine. For instance, virtual machine 152 includes one or more logical processors, each of which represents all or a share of a physical processor resource 154 that may be dynamically allocated to the virtual machine. Virtual machines 152 are managed by hypervisor 156. As examples, the hypervisor may be implemented in firmware running on processors 154 or may be a part of a host operating system executing on the machine. In one example, hypervisor 156 is a VM hypervisor, such as z/VM® offered by International Business Machines Corporation, Armonk, N.Y. One embodiment of z/VM® is described in an IBM publication entitled "z/VM: General Information Manual," IBM Publication No. GC24-5991-05, May 2003, which is hereby incorporated herein by reference in its entirety.

As used herein, firmware includes, e.g., the microcode, millicode and/or macrocode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

Referring to FIGS. 1A and 1B, one or more adapters may issue message signaled interruptions (MSIs). These interruptions are converted to I/O adapter event notifications to one or more operating systems, in which indicators are set and one or more interruptions are requested. An operating system may be an operating system that is not a guest or a guest operating system executed by a host (e.g., z/VM®). To facilitate this processing, various data structures in the I/O hub and memory are used, as described with reference to FIGS. 2A-2B.

Figure 2A:
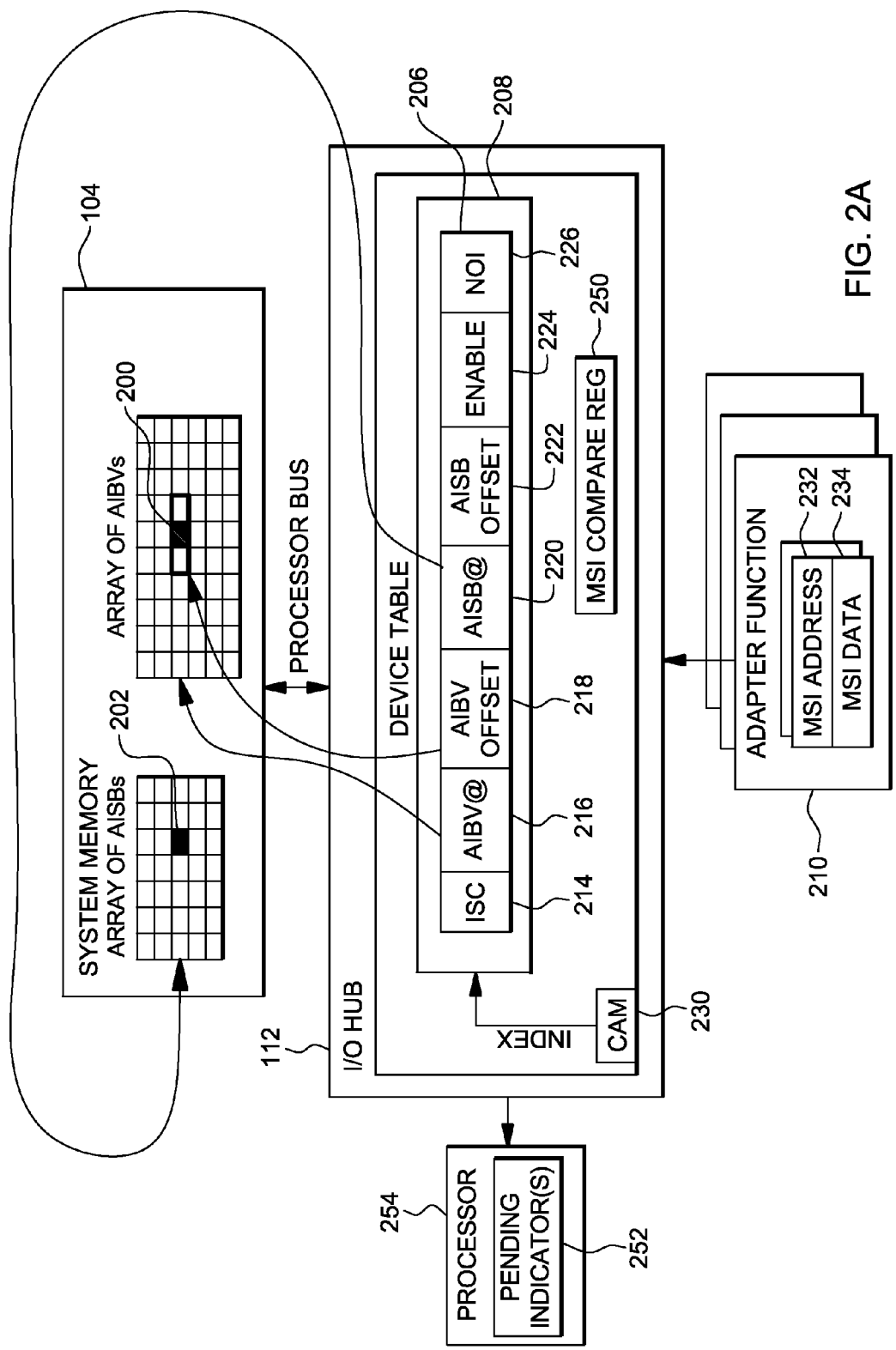
FIG. 2A depicts one embodiment of further details of system memory and the I/O hub of FIG. 1A, in accordance with an aspect of the present invention.
Figure 2B:
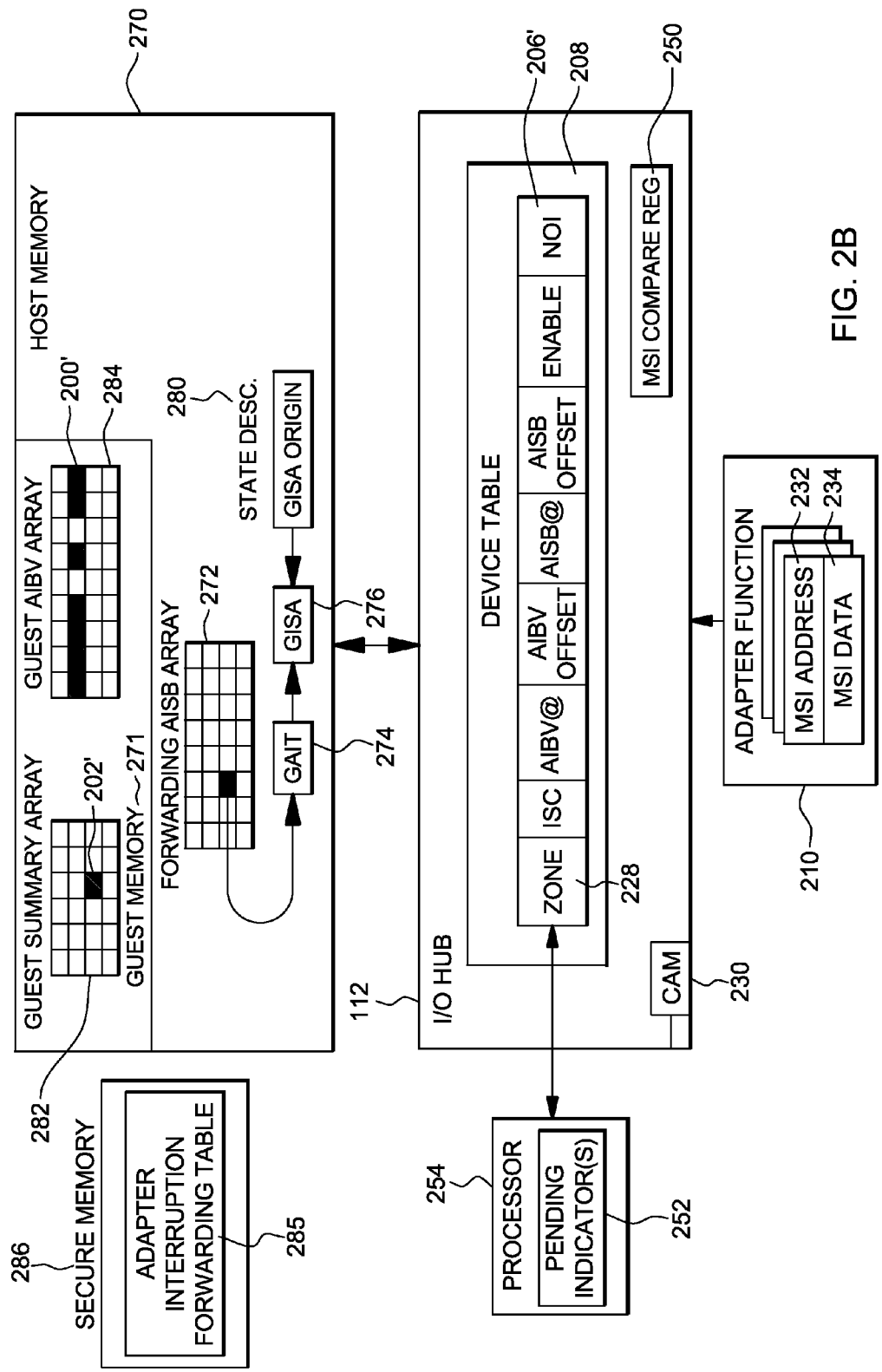
FIG. 2B depicts another embodiment of further details of system memory and the I/O hub of FIG. 1A, in accordance with an aspect of the present invention.

In particular, FIG. 2A depicts one embodiment of the structures used to present an adapter event notification to an operating system that is not a guest, and FIG. 2B depicts one embodiment of the structures used to present an adapter event notification to a guest. In these figures, the memory controller is not shown, but may be used. The I/O hub may be coupled to system memory and/or processor 254 directly or via a memory controller.

Referring to FIG. 2A, in one example, system memory 104 includes one or more data structures usable in facilitating interruption processing. In this example, system memory 104 includes an adapter interruption bit vector (AIBV) 200 and an optional adapter interruption summary bit (AISB) 202 associated with a particular adapter. There may be an AIBV and a corresponding AISB for each adapter.

In one example, adapter interruption bit vector 200 is a single dimension array of one or more indicators (e.g., bits) in main storage that are associated with an adapter (e.g., a PCI function). The bits in the adapter interruption bit vector represent MSI vector numbers. A bit that is set to one in an AIBV indicates a condition or type of event for the associated adapter. In the example of a PCI function, each bit in the associated AIBV corresponds to an MSI vector. Therefore, if a PCI function supports only one MSI vector, its AIBV includes a single bit; if a PCI function supports multiple MSI vectors, its AIBV includes one bit per MSI vector. In the example depicted in FIG. 2A, the PCI function supports multiple MSI vectors (e.g., 3), and therefore, there are multiple bits (e.g., 3) in AIBV 200. Each bit corresponds to a particular event, e.g., bit 0 of the AIBV, when set to one, indicates a completed operation; bit 1 of the AIBV, when set to one, corresponds to an error event; etc. As shown, bit 1 is set, in this example.

In one particular example, an instruction (e.g., a Modify PCI Function Controls instruction) is used to designate an AIBV for a PCI function. Specifically, the instruction, which is issued by the operating system and executed by a processor, specifies the identity of the PCI function, the main storage location of the area that includes the AIBV, the offset from that location to the first bit of the AIBV, and the number of bits that comprise the AIBV. An AIBV may be allocated on any byte boundary and any bit boundary. This allows the operating system the flexibility to pack the AIBVs of multiple adapters into a contiguous range of bits and bytes.

The identity of the PCI function, in one example, is included in a function handle. A function handle includes, for instance, an enable indicator that indicates whether the PCI function handle is enabled; a PCI function number that identifies the function (this is a static identifier and may be used as an index to a function table to locate a particular entry); and an instance number which indicates the particular instance of this function handle. For instance, each time the function handle is enabled, the instance number is incremented to provide a new instance number. The function handle is used to locate a function table entry in a function table that includes one or more entries. For instance, one or more bits of the function handle are used as an index into the function table to locate a particular function table entry. The function table entry includes information regarding its associated PCI function. For example, it may include various indicators regarding the status of its associated adapter function, and it may include one or more device table entry indices used to locate device table entries for this adapter function. The device table entries include information used to provide certain services for their respective adapter functions (e.g., address translation, interrupt processing). (To the operating system, the handle, in one embodiment, is simply an opaque identifier of the adapter.)

In addition to the AIBV, in this example, there is an AISB 202 for the adapter, which includes a single indicator (e.g., bit) associated with the adapter. An AISB that is one indicates that one or more bits have been set to one in an AIBV associated with the AISB. The AISB is optional, and there may be one for each adapter, one for each selected adapter, or one for a group of adapters.

In one particular implementation for PCI functions, an instruction (e.g., the Modify PCI Functions Controls instruction) is used to designate an AISB for a PCI function. Specifically, the instruction, which is issued by the operating system and executed by a processor, specifies the identity of the PCI function (e.g., the handle), the main storage location of the area that includes the AISB, the offset from that location to the AISB, and an adapter interruption summary notification enablement control indicating there is a summary bit. An AISB may be allocated on any byte boundary and any bit boundary. This allows the operating system the flexibility to pack the AISBs of multiple adapters into a contiguous range of bits and bytes.

The operating system may assign a single AISB to multiple PCI functions. This associates multiple AIBVs with a single summary bit. Therefore, such an AISB that is one indicates that the operating system should scan multiple AIBVs.

In one example, the AIBV and the AISB are pointed to by addresses located in a device table entry 206 of a device table 208 located in I/O hub 112. In one example, device table 208 is located within the address translation and protection unit of the I/O hub.

Device table 208 includes one or more entries 206, each of which is assigned to a particular adapter function 210. A device table entry 206 includes a number of fields, which may be populated using, for instance, the above-mentioned instruction. The values of one or more of the fields are based on policy and/or configuration. Examples of the fields include:

Interruption Subclass (ISC) 214: Indicates an interruption subclass for the interruption. The ISC identifies a maskable class of adapter interruptions that may be associated with a priority with which the operating system will process the interruption;

AIBV Address (@) 216: Provides, e.g., an absolute address of the beginning of the storage location that includes the AIBV for the particular adapter function assigned to this device table entry;

AIBV Offset 218: An offset into the main storage location to the beginning of the AIBV;

AISB Address (@) 220: Provides, e.g., an absolute address of the beginning of the storage location that includes the AISB for this PCI function, if the operating system has designated an AISB;

AISB Offset 222: An offset into the main storage location to the AISB;

Adapter Interruption Summary Notification Enablement Control (Enable) 224: This control indicates whether there is an AISB;

Number of Interruptions (NOI) 226: Indicates the maximum number of MSI vectors allowed for this PCI function, with zero indicating none allowed.

In other embodiments, the DTE may include more, less or different information.

In one embodiment, the device table entry to be used for a particular interruption request by an adapter is located using, for instance, a requestor identifier (RID) (and/or a portion of the address) located in a request issued by the adapter (e.g., PCI function 210). The requestor ID (e.g., a 16-bit value specifying, for instance, a bus number, device number and function number) is included in the request, as well as an address to be used for the interrupt. The request, including the RID and the address, are provided to, e.g., a contents addressable memory (CAM 230) via, e.g., a switch, and the contents addressable memory is used to provide an index value. For instance, the CAM includes multiple entries, with each entry corresponding to an index into the device table. Each CAM entry includes the value of a RID. If, for instance, the received RID matches the value contained in an entry in the CAM, the corresponding device table index is used to locate the device table entry. That is, the output of the CAM is used to index into device table 208. If there is no match, the received packet is discarded. (In other embodiments, a CAM or other lookup is not needed and the RID is used as the index.) The located DTE is used in processing an interrupt request, as described herein.

In one particular example, if the interrupt request is for a guest (e.g., a pageable storage mode guest; i.e., a V=V guest) executing in a particular zone or logical partition, then the device table entry also includes a zone field 228, as shown in FIG. 2B. This field indicates the zone to which the guest belongs. In another embodiment, this field is not used, or may be used even in situations where guests are not provided (e.g., to designate a zone or logical partition in which an operating system is running).

In one example, in the z/Architecture®, a pageable guest is interpretively executed via the Start Interpretive Execution (SIE) instruction, at level 2 of interpretation. For instance, the logical partition (LPAR) hypervisor executes the SIE instruction to begin the logical partition in physical, fixed memory. If z/VM® is the operating system in that logical partition, it issues the SIE instruction to execute its guests (virtual) machines in its V=V (virtual) storage. Therefore, the LPAR hypervisor uses level-1 SIE, and the z/VM® hypervisor uses level-2 SIE.

To facilitate interrupt processing for guests, other data structures are used, some of which are stored in host memory 270, and others are in guest memory 271. Examples of these structures are described below.

In one example, host memory 270 includes, for instance, a forwarding AISB array 272 and a guest adapter interruption table (GAIT) 274. Forwarding AISB array 272 is an array of AISBs that is used in conjunction with the guest adapter interruption table to determine if an MSI request is targeted to a guest or its host. The forwarding AISB array includes the host AISBs of each PCI function the host has assigned to a guest and for which the host, on behalf of the guest, is requesting adapter event notification interruption. Such an array is allocated in host storage by a host of the guest (e.g., z/VM®).

The guest adapter interruption table 274 is used in conjunction with the forwarding AISB array to determine whether an MSI request is targeted to the host or one of its guests, and if to a guest, which guest. There is a one-to-one correspondence between indicators (e.g., bits) in the forwarding AISB array and the GAIT entries. This means that when a bit in the forwarding AISB array is set to one and the corresponding GAIT information contains forwarding information, an adapter event notification is made pending for the adapter for the guest associated with the AISB indicator (e.g., bit) and the corresponding GAIT entry.

Figure 2C:
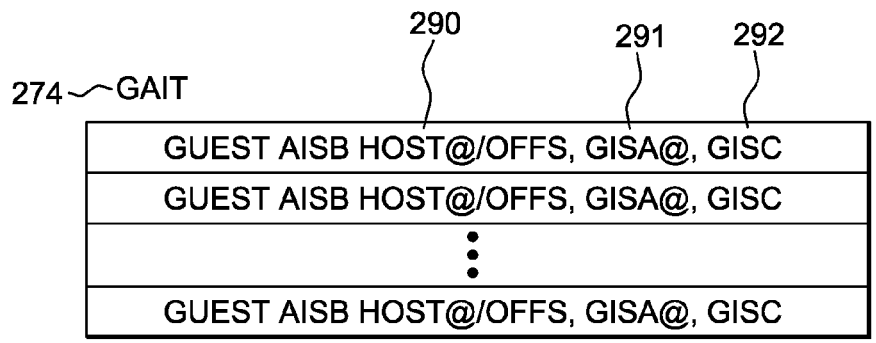
FIG. 2C depicts one embodiment of entries of a guest adapter interruption table (GAIT) used in accordance with an aspect of the present invention.

When a GAIT entry is used and includes a defined value (e.g., all zeros), the target of the MSI request is the host. When a GAIT entry is used and does not contain the defined value, the target of the MSI request is a guest. Furthermore, when the target of an MSI request is a guest, the GAIT entry includes the following information, as depicted in FIG. 2C: the host address and offset of the guest AISB for the PCI function 290; the host address of a guest interruption state area (GISA) 291; and the guest interruption subclass (GISC) 292 for the adapter interruption to be generated for the guest.

Figure 2D:
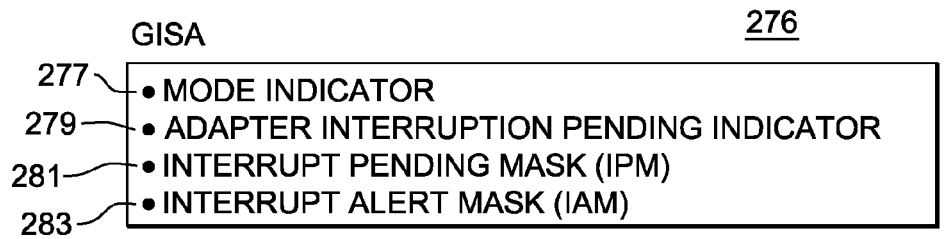
FIG. 2D depicts one embodiment of a guest interruption state area (GISA) used in accordance with an aspect of the present invention.

Further details regarding a guest interruption state area (GISA) 276 are provided with reference to FIG. 2D. In one example, GISA 276 is a control block in which the guest adapter interruption is made pending. In accordance with an aspect of the present invention, it includes, for instance, a single interruption mode mask (SIMM) 277, which is a mask that has one bit per guest interruption subclass and is used to indicate if the interruption mode for the subclass is the single interruption mode, as described below; a no interruptions mode mask (NIMM) 279, which is a mask that has one bit per guest interruption subclass and used to indicate if the interruption mode for the ISC is the no interruptions mode, as described below; an interruption pending mask (IPM) 281, which is a mask associated with the guest that includes indicators for a plurality of interruption subclasses (ISCs); and an interruption alert mask (IAM) 283, which is another mask corresponding to a guest. In one example, each bit in the masks (e.g., SIMM, NIMM, IPM and IAM masks described herein) corresponds one for one with a guest ISC.

As examples, the origin or address of the GISA is designated in GAIT 274, as well as in a state description 280. The state description is, for instance, a control block maintained by the host that defines a virtual CPU for a guest to the interpretation hardware/firmware. A unique GISA is used per guest, and there is one and only one GISA per guest, in this embodiment. Therefore, if the guest is defined to have multiple virtual CPUs, multiple state descriptions are maintained by the host, each of which contains the origin of the address of the same GISA.

In addition to the above, in guest memory (which is pinned, i.e., fixed, made non-pageable, in host memory), there is a guest AISB array 282 and a guest AIBV array 284. Guest AISB array 282 includes a plurality of indicators 202' (e.g., AISBs), each of which may be associated with an I/O adapter. The AISB for an I/O adapter, when one, indicates that one or more bits have been set to one in the adapter interruption bit vector (AIBV) associated with the I/O adapter.

AIBV array 284 includes one or more AIBVs 200' (e.g., 3 in this example), and each AIBV 200', as described above with reference to AIBV 200, is a single dimension array of one or more indicators (e.g., bits) that are associated with an I/O adapter. Each bit in the AIBV, when one, indicates a condition or type of event for the associated I/O adapter.

In addition to the data structures in host and guest memory, a data structure referred to as an adapter interruption forwarding table (AIFT) 285 is maintained in secure memory 286 that is accessible by neither the host nor the guest. The adapter interruption forwarding table is used by system firmware to determine if an MSI request is targeted to a logical partition in which a host and guest are running The AIFT is indexed by the zone number that identifies the logical partition to which a PCI function is assigned. When an AIFT entry is used and the entry includes a defined value (e.g., all zeros), the target of the adapter event notification is the operating system running in the designated logical partition. When an AIFT entry is used and the entry does not contain the defined value, the firmware uses the forwarding AISB array and the GAIT to determine if the target of the adapter event notification is a host or a guest running in the logical partition.

Figure 2E:
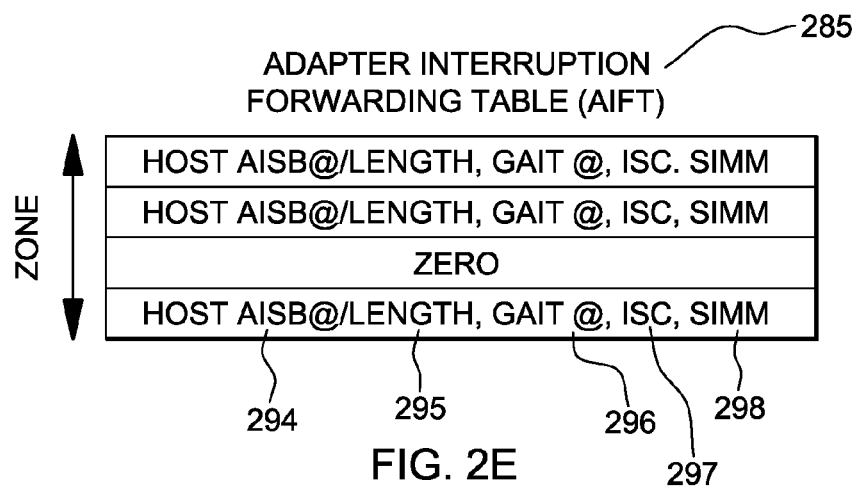
FIG. 2E depicts one embodiment of entries of an adapter interruption forwarding table (AIFT) used in accordance with an aspect of the present invention.

In one example, as shown in FIG. 2E, an AIFT entry of AIFT 285 includes, for instance:

The address of the forwarding AISB array in the partition's (host's) storage 294;

The length 295 of the forwarding AISB array, in bits, and of the GAIT in GAIT entries;

The address of the GAIT 296 in the partition's storage;

The host interruption subclass (ISC) 297 associated with MSI requests that are to be forwarded to guests for that partition; and A single interruption mode mask (SIMM), which is set by, for instance, a Set Interruptions Control (SIC) instruction, described below.

Each bit in this mask represents an interruption subclass. Therefore, and, for example, when the operating system executes the SIC instruction specifying single-interruption mode for ISC 4, the result is that bit 4 in the mask is set to one. The firmware uses this bit to decide whether to transition to no-interruptions mode when presenting an interruption.

Returning to FIG. 2A and/or FIG. 2B, to request an interruption, adapter function 210 sends a packet to the I/O hub. This packet has an MSI address 232 and associated data 234. The I/O hub compares at least a part of the received address to a value in a MSI compare register 250. If there is a match, then an interruption (e.g., MSI) is being requested, as opposed to a DMA operation. The reason for the request (i.e., type of event that has occurred) is indicated in associated data 234. For example, one or more of the low order bits of the data are used to specify a particular interrupt vector (i.e., an MSI vector) that indicates the reason (event).

The interruption request received from the adapter is converted into an I/O adapter event notification. That is, one or more indicators (e.g., one or more AIBVs and optionally an AISB) are set and an interruption to the operating system (host or guest) is requested, if one is not already pending. In one embodiment, multiple interruption requests (e.g., MSIs) from one or more adapters are coalesced into a single interruption to the operating system, but with respective AIBV and AISB indications. For instance, if the I/O hub has already received an MSI request, has, in turn, provided an interruption request to a processor, and that interruption is still pending (e.g., for one reason or another, the interruption has not been presented to the operating system (e.g., interrupts are disabled)), then if the hub receives one or more other MSIs, the CPU does not generate additional interruptions. The one interruption replaces and represents the plurality of MSI requests. However, one or more AIBVs and optionally one or more AISBs are still set.

Further details regarding converting an MSI (or other adapter interruption request) to an I/O adapter event notification are described below. Initially, details regarding converting an MSI to an I/O adapter event notification to be presented to an operating system that is not a guest are described. Thereafter, details regarding converting an MSI to an I/O adapter event notification to be presented to a guest operating system are described.

Figure 3:
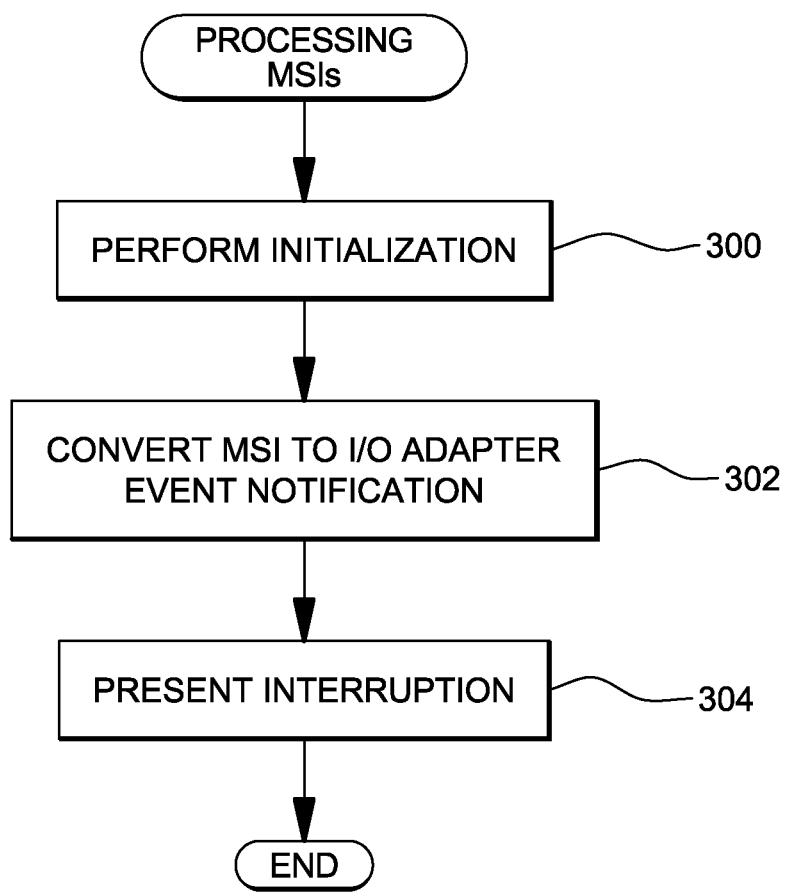
FIG. 3 depicts one embodiment of an overview of the logic to process message signaled interruptions received from adapters, in accordance with an aspect of the present invention.

Referring to FIG. 3, in one example, to convert an MSI request to an I/O adapter event notification, certain initialization is performed, STEP 300. During initialization, the operating system performs a number of steps to configure an adapter for an adapter event notification via an MSI request. In this example, it is a PCI function being configured; although, in other embodiments, it can be other adapters, including other types of adapter functions.

In one embodiment, as part of initialization, a determination is made as to the PCI functions in the configuration. As an example, an instruction, such as a Query List instruction, is used to obtain a list of the PCI functions assigned to the requesting configuration (e.g., assigned to a particular operating system). This information is obtained from a configuration data structure that maintains this information.

Next, for each of the PCI functions in the list, a determination is made as to the MSI address to be used for the PCI function and the number of MSI vectors supported by the PCI function. The MSI address is determined based on the characteristics of the I/O hub and the system in which it is installed. The number of MSI vectors supported is based on policy and is configurable.

Additionally, for each PCI function, the AIBV is allocated, as well as the AISB, if any. In one example, the operating system determines the allocation of the AIBV to allow for efficient processing of one or more adapters, typically based on the class of adapter. For example, the AIBVs for storage adapters may be located adjacent to each other. The AIBV and AISB are allocated and cleared to zeros, and a register adapter interruption operation is specified (e.g., using a Modify PCI Function Controls instruction). This operation registers the AIBV, the AISB, the ISC, the number of interruptions (MSI vectors) and the adapter interruption summary notification enablement control. These parameters are stored in a device table entry corresponding to the PCI function for which initialization is performed. Then, the PCI function's configuration space is written. Specifically, the MSI address and MSI vector count are written into the configuration address space of the PCI function consistent with the previous registration. (In one example, a PCI function includes a plurality of address spaces, including e.g., a configuration space, an I/O space, and one or more memory spaces.)

Thereafter, during operation, a PCI function may generate an MSI, which is converted to an adapter event notification, STEP 302. For example, during operation, when a PCI function wishes to generate an MSI, it typically makes some information available to the operating system that describes the condition. This causes one or more steps to occur in order to convert the PCI function's MSI request to an I/O adapter event notification to the operating system.

For instance, initially, a description of the event to which the interruption is requested is recorded. That is, the PCI function records a description of the event in one or more adapter-specific event-description-recording structures stored, for instance, in system memory. This may include recording the type of the event, as well as recording additional information. Additionally, a request is initiated by the PCI function specifying the MSI address and the MSI vector number, as well as a requestor ID. The request is received by the I/O hub, and responsive to receiving the request, the requestor ID in the request is used to locate the device table entry for the PCI function. The I/O hub compares at least a portion of the address in the request with the value in the MSI compare register. If they are equal, then an MSI address has been specified, and thus, an MSI has been requested. Thereafter, a determination is made as to whether the MSI vector specified in the request is less than or equal to the number of interruptions (NOI) allowed for this function. If the MSI vector number is greater than NOI, an error is indicated. Otherwise, the I/O hub issues a set bit function to set the appropriate AIBV bit in storage. The appropriate bit is determined by adding the MSI vector number to the AIBV offset specified in the device table entry and displacing this a number of bits from the AIBV address specified in the device table entry. Moreover, if an AISB has been designated, the I/O hub uses a set bit function to set the AISB, using the AISB address and the AISB offset in the device table entry.

Next, in one embodiment, a determination is made (e.g., by the CPU or I/O hub) as to whether an interruption request is already pending. To make this determination, a pending indicator is used. For instance, a pending indicator 252 (FIG. 2A, FIG. 2B) stored in memory of a processor 254, which is accessible to processors of the computing environment that may process the interrupt, is checked. If it is not set, then it is set. If it is already set, processing is complete and another interruption request is not requested. Therefore, subsequent interruption requests are encompassed by the one request already pending.

In one particular example, there may be one pending indicator per interruption subclass, and therefore, the pending indicator of the interruption subclass assigned to the requesting function is the indicator that is checked.

Asynchronously, one or more processors check the pending indicator. In particular, each processor enabled for the ISC (and zone in another embodiment) polls on the indicator when, for instance, interrupts are enabled for that processor (i.e., for its operating system). If one of the processors determines that the indicator is set, it arbitrates with the other processors enabled for the same ISC (and zone in another embodiment) to handle the interruption. The processor to handle the interrupt then presents the interruption to the operating system, STEP 304, as described below.

In accordance with an aspect of the present invention, processing associated with presenting the interruption to the operating system is dependent on an interruptions mode (a.k.a., control mode) set for the adapter function that issued the interruption (i.e., set for the ISC of the adapter function). In particular, an adapter interruption suppress facility is provided and associated with adapter functions. This facility includes, for instance, three modes of adapter interruptions for adapter functions:

All interruptions mode: All pending adapter interruptions for adapter functions may be recognized and presented, subject to the ISC enablement. The adapter interruption suppression facility is placed in the all interruptions mode for all ISCs following an I/O system reset. The adapter interruption suppression facility is placed in the all interruptions mode for a specific ISC following successful completion of, for instance, a Set Interruption Controls instruction that specifies the all interruptions mode for a particular ISC;

Single interruption mode: A single pending interruption for adapter functions may be recognized and presented subject to ISC enablement. For instance, when making the adapter interruption pending, the mode of the adapter interruption suppression facility changes to the no interruptions mode for the ISC, which is described below. The adapter interruption suppression facility is placed in the single interruption mode for a specific ISC following successful completion of the Set Interruption Controls instruction that specifies the single interruption mode for the ISC;

No interruptions mode: Adapter interruption requests from adapters subject to the adapter interruption suppression facility for the ISC are ignored. The no interruptions mode remains in effect until the operating system issues a Set Interruption Controls instruction specifying either the all interruptions mode or the single interruption mode, or until I/O subsystem reset is performed.

Figure 4:
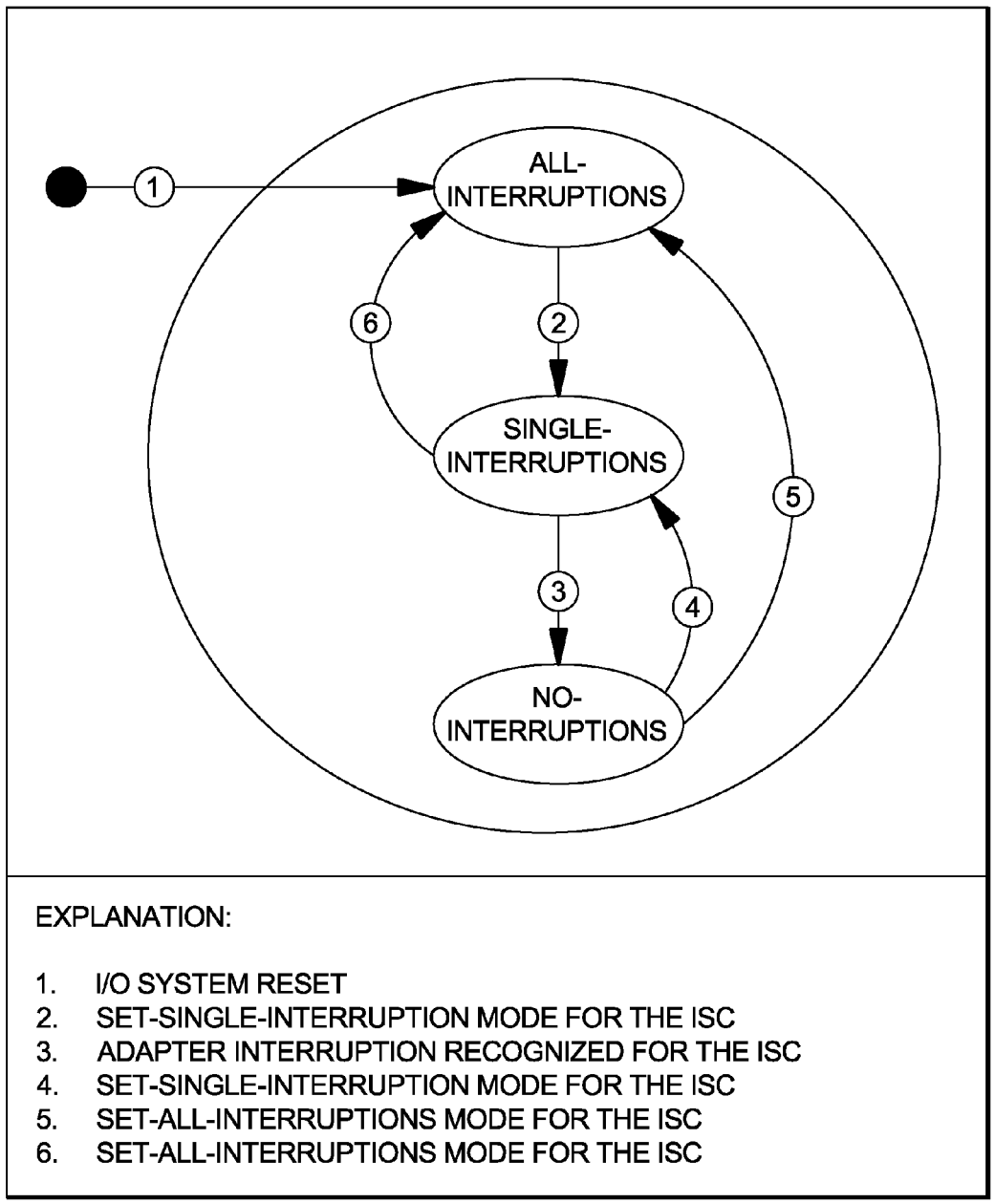
FIG. 4 depicts one example of a state diagram depicting the transitions between various interruption processing modes, in accordance with an aspect of the present invention.

One example of a state transition diagram showing the various modes is depicted in FIG. 4. As shown, at 1, an I/O system reset is performed and all interruptions are allowed. At 2, a single interruption mode is set for the ISC. At 3, an adapter interruption is recognized for the ISC and the interruption mode transitions to no interruptions. At 4, from the no interruptions mode, a single interruption mode is provided or at 5, an all interruptions mode may be provided. Further, from single interruption mode, a request can be made for all interruptions mode.

Figure 5A:
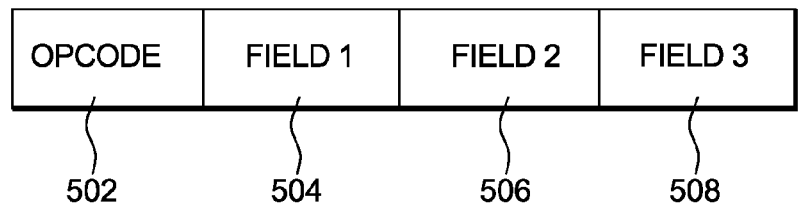
FIG. 5A depicts one embodiment of a Set Interruption Controls instruction used in accordance with an aspect of the present invention.
Figure 5B:
FIGS. 5B-5D depict examples of contents of fields used by the Set Interruption Controls instruction of FIG. 5A, in accordance with an aspect of the present invention.
Figure 5C:
Figure 5D:

To transition between some of the modes, a Set Interruption Controls instruction is used, in one example. One embodiment of this instruction is described with reference to FIGS. 5A-5E. As depicted in FIG. 5A, in one example, a Set Interruption Controls instruction 500 includes an opcode 502 specifying that this is the Set Interruption Controls instruction; a first field (Field 1) 504 including a location (e.g., a register) that specifies an operation control 510 (FIG. 5B) for the instruction; a second field (Field 2) 506 that designates a location (e.g., a register) that contains an interruption subclass 520 (FIG. 5C) for the operation control designated by Field 1; and a third field (Field 3) 508, which as shown in FIG. 5D, includes the logical address of an adapter interruption parameters block (AIPB) 530, described below.

In one example, operation control 510 may be encoded as follows:

0-Set All Interruptions Mode: The adapter interruption suppression facility is set to allow the presentation of all adapter interruptions requested for the designated ISC.

1-Set Single Interruption Mode: The adapter interruption suppression facility is set to allow the presentation of a single adapter interruption request for the designated ISC. Subsequent adapter interruption requests for the designated ISC are suppressed.

2-Set Adapter Event Notification Interruption Control: The adapter event notification interpretation controls included in the adapter interruption parameters block designated by Field 3 are set.

Figure 5E:
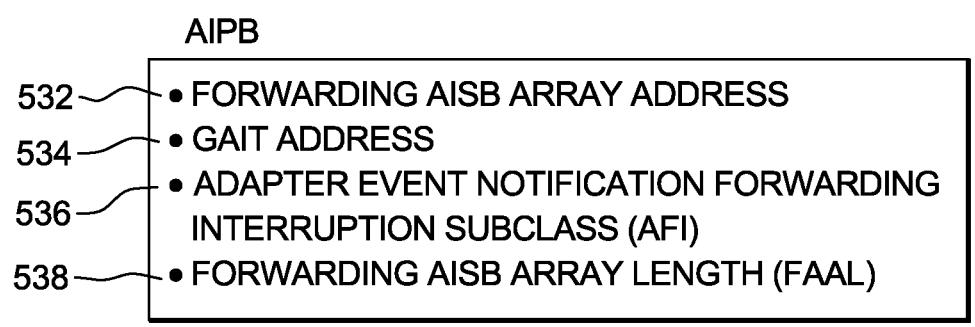
FIG. 5E depicts one example of an adapter interruption parameters block (AIPB) used in accordance with an aspect of the present invention.

One example of the AIPB 530 is described with reference to FIG. 5E. As depicted, AIPB 530 includes, for instance:

Forwarding AISB Array Address 532: This field designates a forwarding AISB array that is used in conjunction with the guest adapter interruption table (GAIT) and the specified adapter event notification forwarding interruption subclass (AFI) to determine whether an adapter interruption request that is signaled by an I/O adapter is targeted to a pageable storage mode guest.

When the forwarding AISB array address is zero, the target of the interruption request is the host. When the forwarding AISB array address is not zero, the target of the interruption request is further determined from the AFI and the GAIT.

Guest Adapter Interruption Table (GAIT) Address 534: This field provides an address of the GAIT to be used to determine whether an adapter interruption request that is signaled by an I/O adapter is targeted to a pageable storage mode guest, and if targeted to such a guest, the GAIT is also used for the setting of guest AISBs, and for the delivery of adapter interruption requests to the guest.

Adapter Event Notification Forwarding Interruption Subclass (AFI) 536: This field indicates an ISC value. A pending and presentable interruption on this ISC initiates the adapter event notification forwarding process, whereby the contents of the forwarding AISB array and the GAIT are used to further determine the target (host or guest) of interruption requests from applicable I/O adapters for the corresponding ISC. When an interruption request is made from an applicable adapter for the ISC designated by the AFI field, the target of the interruption may be a pageable storage mode guest and the forwarding AISB array and GAIT are used to determine the actual target (host or guest) of any adapter event notifications indicated in the forwarding AISB array. When an interruption request is made from an applicable adapter for an ISC other than the ISC designated by the AFI field, the forwarding AISB array address and the GAIT address do not apply and the target of interruption requests for the corresponding ISC is the host.

Forwarding AISB Array Length (FAAL) 538: This field indicates the length of the forwarding AISB array in bits, or the GAIT in units of GAIT entries.

Responsive to executing the Set Interruption Controls instruction, one or more interruption controls are set, based on the operation controls specified in Field 1. When the value of the operation control indicates set all interruptions mode or set single interruptions mode, Field 2 includes a value designating the interruption subclass for which the interruption control is to be set.

When the value of the operations controls indicates set adapter event notification interpretation controls, the second operand address (Field 3) is a logical address of an adapter interruption parameters block (AIPB) that includes the controls to be set. The adapter interruption parameters block is used by a host to facilitate the interpretation of (that is, the forwarding of) adapter interruptions originating from I/O adapters associated with the adapter event notification facility for pageable storage mode guests.

In one example, the set value of the operation control is stored in a location (e.g., control block) accessible to firmware and the operating system.

One embodiment of the logic associated with presenting adapter interruption requests to an operating system taking into account the interruptions mode set for the adapter function (e.g., ISC) is described with reference to FIG. 6.

Figure 6:
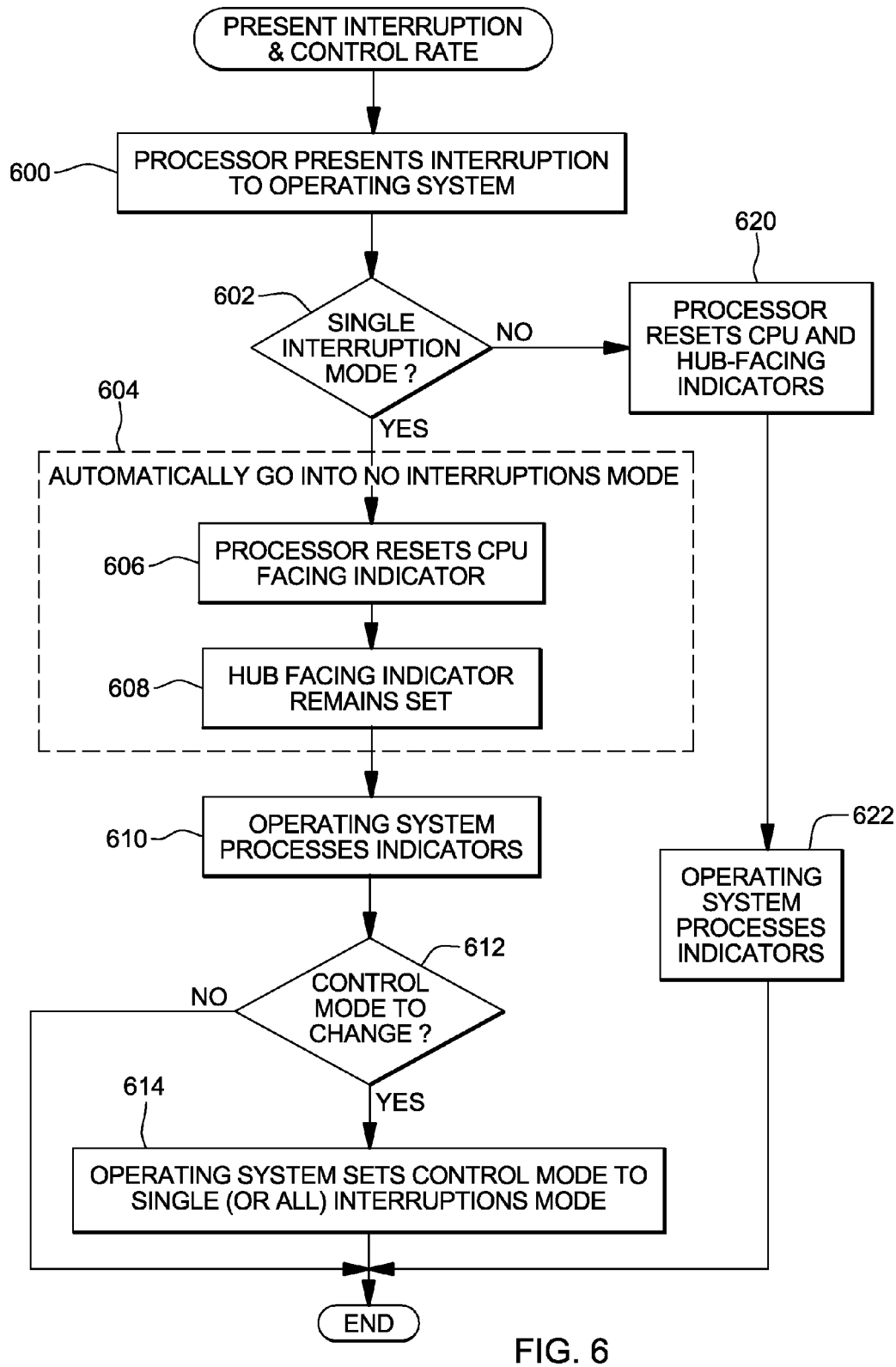
FIG. 6 depicts one embodiment of the logic to control the rate at which interrupts are processed, in accordance with an aspect of the present invention.

Referring to FIG. 6, initially, the processor presents the interruption to the operating system, STEP 600. That is, the processor determines that the pending indicator is set and presents the interruption to the operating system. In one particular example, there are two pending indicators: a CPU-facing pending indicator, which is the indicator checked by the processor (referred to above as the pending indicator), and a hub-facing indicator, which is set, in response to receiving an interruption request from the hub. The use of these two indicators is further described below.

Responsive to presenting the interruption to the operating system, the processor (e.g., firmware) determines whether the interruptions control mode for the ISC is the single interruption mode, INQUIRY 602. This determination is made by checking the stored operation control value. If the interruptions mode is the single interruption mode, then responsive to presenting the interruption to the operating system, the interruptions mode automatically transitions into a no interruptions mode, STEP 604. In this mode, the processor resets the CPU-facing indicator (e.g., sets it to 0), STEP 606, but the hub-facing indicator remains set (e.g., =1), STEP 608. Thus, to the processor there are no interrupts to be presented and to the hub an interrupt is already presented, so other interrupts are suppressed.

The operating system processes the indicators. For instance, the operating system determines whether any AISBs are registered. If not, the operating system processes the set AIBVs, as described below. Otherwise, the operating system processes any set AISBs and AIBVs. For example, it checks whether any AISBs are set. If so, it uses the AISB to determine the location of one or more AIBVs. For example, the operating system remembers the locations of the AISBs and AIBVs. Furthermore, it remembers for which adapter each AISB and AIBV represents. Therefore, it may maintain a form of a control block or other data structure that includes the locations of AISBs and AIBVs and the association between AISBs, AIBVs and adapter id (handle). It uses this control block to facilitate the location of an AIBV based on its associated AISB. In a further embodiment, an AISB is not used. in that situation, the control block is used to locate the particular AIBV. Responsive to locating the one or more AIBVs, the operating system scans the AIBVs and processes any AIBVs. It processes the interruption in a manner consistent with the presented event (e.g., provides status). For example, with a storage adapter, an event may indicate that an operation has completed. This results in the operating system checking status stored by the adapter to see if the operation completed successfully and also details of the operation. In the case of a storage read, this is an indication that the data read from the adapter is now available in system memory and can be processed.

The operating system continues to scan and process set bits regardless if they were set by the interrupt presented to the operating system or a suppressed interrupt. During processing of the indicators, the operating system may determine, in accordance with an aspect of the present invention, that another interrupt should be presented allowing at least one other processor to process set event indicators. In one example, this may be based on policy and is reconfigurable. For instance, a determination may be made by the operating system that the adapter event notifications are arriving at a rate faster than can be currently handled by the operating system (i.e., the operating system cannot timely process the set AIBVs). This could be determined in a number of ways, including comparing the number of set bits received or still to be processed to a threshold or by some other mechanism. Many possibilities exist. Alternatively, the operating system may have completed processing of all indicators, and prior to exiting the event handler, it may allow additional interruptions to re-invoke the event handler.

If the operating system determines that another interrupt is not needed, and therefore, the control mode is not to be changed, INQUIRY 612, then the operating system continues processing the indicators. Otherwise, the operating system changes the control mode to either a single or all interruptions mode, STEP 614. This is performed, in one example, by using the Set Interruptions Controls command.

Responsive to the control mode being set to the single interruption or all interruptions mode, the CPU-facing indicator and the hub-facing indicator are cleared (e.g., to zeros). Then, when an interrupt request is received at the hub, those indicators will be set to one enabling a processor to handle the interruption.

Returning to INQUIRY 602, if it is determined that the operating system is not in a single interruption mode, then it is assumed that it is in an all interruptions mode and the processor resets both the CPU and hub-facing indicators (e.g., to zero), STEP 620. This enables other interrupts to be posted by the hub and other interrupts to be provided to an operating system. Further, the operating system processes the AISB and AIBV indicators, as described above, STEP 622. This concludes processing.

As described above, in addition to converting an MSI to an adapter event notification to an operating system that is not a guest, in a further embodiment, the adapter event notification may be presented to a guest (e.g., a pageable guest). Further details regarding converting an MSI request to an adapter event notification to a guest are now described.

Referring again to FIG. 3, initially, certain initialization is performed, STEP 300. In this example, host initialization and guest initialization are performed. For instance, during host initialization (or when the first PCI function is assigned to a guest), a host allocates the forwarding AISB array and the GAIT. The host then registers the locations and lengths of the forwarding AISB array and the GAIT in, for instance, the adapter interruption forwarding table (AIFT). In one example, the Set Interruption Controls instruction, is used to register the locations and lengths of the forwarding AISB array.

Further, the host specifies the host interruption subclass that is to be assigned to PCI adapters that are assigned to guests. Again, in one example, an instruction, such as the Set Interruption Controls instruction, is used to specify this information. This information is also retained in the AIFT entry for the partition for which the host is running. This concludes host initialization.

During guest initialization, a guest performs a number of tasks to configure its PCI functions for adapter event notification via an MSI request. In one example, one or more of the instructions that invoke these functions cause an interception to the host, and therefore, the host takes action for each interception, as described below.

Initially, the guest determines the PCI functions and the configuration for which it has access. In one example, the guest issues an instruction (e.g., a Query List instruction) to obtain the list of PCI functions, and this instruction is intercepted by the host. Since during host initialization, the host has already determined which PCI functions are assigned to the host, responsive to interception of the guest request for the PCI functions, the host constructs and returns a response to the guest and includes only those PCI functions also further assigned to the guest by the host.

Thereafter, for each PCI function of the guest configuration, certain processing is performed. For instance, a determination is made as to the MSI address to be used for the PCI function and the number of MSI vectors supported by the PCI function. In one example, the MSI address is determined using a Query Group instruction that provides characteristics common to a group of adapter functions, and the number of MSI vectors supported by the PCI function is based on the capabilities of the adapter. The host, during its initialization, has determined this information, and therefore, responsive to interception of the guest command, the host constructs and returns a response to the guest that includes the MSI address and the maximum number of MSI vectors.

Additionally, the AIBV is allocated, as well as the AISB, if any. The AIBV and AISB are allocated and initialized to zeros, and a register adapter interruption operation is specified. Responsive to the requested register adapter interruption operation, the host intercepts the operation and performs registration. This includes, for instance, pinning the guest AIBV in host storage (that is, fixing the guest page in host memory and making it non-pageable). Further, if the guest specified an AISB, the host also pins the guest AISB in host storage. The host assigns an AISB from the forwarding AISB array and implicitly, the corresponding GAIT entry to the PCI function.

Alternatively, if the AISB and the ISC specified by the guest are the same AISB and ISC registered previously by the guest (for another PCI function), the host may use the same forwarding AISB and GAIT entry assigned for that prior request. This reduces overhead. The host copies the guest interruption subclass into the GAIT array. If the guest specified an AISB, the host copies the host address of the guest AISB and its offset into GAIT entry. Further, the host copies the guest GISA designation from its state description into the GAIT entry.

On behalf of the guest, the host executes an instruction, such as a Modify PCI Function Controls instruction, to specify the register adapter interruptions operation and designates the following information: the host address and guest offset of the guest AIBV; the host address and offset of the host AISB and the forwarding AISB array assigned to the adapter; the host interruption subclass for the adapter; and the number of MSIs specified by the guest. Responsive to executing the Modify PCI Function Controls instruction, a device table entry corresponding to the PCI function for which initialization is being performed is selected, and the various parameters are stored in the device table entry. For instance, the guest AIBV; the host-selected forwarding AISB; the host ISC; and the number of interruptions are set to values obtained from configuring the function. Further, various information is registered in the GAIT, including, for instance, the host address and offset of the guest AISB, the guest ISC, and the address of the GISA for the guest. This completes the registration process.

Thereafter, the PCI function's configuration space is written. Specifically, the MSI address and MSI vector count are written into the configuration address space of the PCI function consistent with the previous registration. This completes guest initialization.

Subsequent to performing initialization, a received MSI is converted to an I/O adapter event notification, STEP 302. Initially, a description of the event for which the interruption is requested is recorded. Additionally, a request is initiated by the PCI function specifying the MSI address and the MSI vector number, as well as a requestor ID. This request is received by the I/O hub and responsive to receiving the request, the requestor ID in the request is used to locate the device table entry for the PCI function. The I/O hub compares at least a portion of the address in the request with the value in the MSI compare register. If they are equal, an MSI is being requested.

Thereafter, a determination is made as to whether the MSI vector number specified in the request is less than or equal to the number of interruptions (NOIs) allowed for this function. If the MSI vector number is greater than NOI, an error is indicated. Otherwise, the I/O hub issues a set bit function to set the appropriate AIBV bit in storage. The appropriate bit is determined by adding the MSI vector number to the AIBV offset specified in the device table entry and displacing this a number of bits from the AIBV address specified in the device table entry. Based on the manner in which the host sets up the registration of the interruption information, the bit that is set is the guest AIBV that has been pinned in host storage.

Moreover, if an AISB has been designated, the I/O hub uses a set bit function to set the AISB, using the zone number (as a relocation zone), the AISB address and the AISB offset in the device table entry. Again, based on the manner in which the host set up its registration of the interruption information, the bit that is set is the host AISB in the forwarding AISB array in host storage. Note that if the system does not support the setting of a single bit, multiple bits may be set (e.g., a byte) to indicate an adapter event or summary indication.

Next, in one embodiment, a determination is made (e.g., by the CPU or the I/O hub) as to whether an interruption request is already pending. That is, the pending indicator (e.g., CPU-facing pending indicator) is checked to see if it is set. If it is set, then it is not set again.

Asynchronously, one or more processors check the pending indicator. In particular, each processor enabled for the ISC (and zone) polls on the indicator when, for instance, interrupts are enabled for that processor. If one of the processors determines that the indicator is set, it arbitrates with the other enabled processors to handle the interruption, STEP 304.

To handle the interrupt, the firmware uses the zone number specified in the adapter interruption request to locate the AIFT entry for the logical partition (zone). Responsive to locating the AIFT entry, the firmware checks whether the AIFT entry includes a defined value (e.g., all zeros). If the AIFT entry includes the defined value, there is no host running guests in the logical partition, and the adapter interruption is made pending for the logical partition identified by the zone number (or for the operating systems if no logical partitions are configured). This interruption is then handled as described above with reference to presenting an interruption to an operating system that is not a guest.

If the AIFT entry does not include the defined value, meaning that there is a host running one or more guests, then processing continues with checking whether the ISC specified as part of the adapter interruption request is equal to the ISC in the AIFT entry. If the ISC specified as part of the adapter interruption request does not equal the ISC in the AIFT entry, the adapter interruption request is not targeted to a guest, and is made pending for the logical partition identified by the zone number (i.e., the host). Processing then proceeds as described above with reference to the presenting an interruption to an operating system that is not a guest.

Otherwise, the ISC specified as part of the adapter interruption request does equal the ISC in the AIFT entry, meaning that the adapter interruption request is targeted to a guest. The firmware uses the forwarding AISB array address and length in the AIFT entry to scan the forwarding AISB array designated by the host looking for indicators (e.g., bits) that are set to one. For each indicator that is set to one, the firmware uses information in the corresponding GAIT entry to process that indicator.

Initially, a determination is made as to whether the GAIT entry includes a defined value (e.g., all zeros), meaning that the adapter interruption is not targeted to a guest, INQUIRY 750. If the GAIT entry does include the defined value, the adapter interruption is made pending for the host. The interrupt is presented to the host as described above.

However, if the GAIT entry does not include the defined value meaning that the adapter interruption is targeted to the corresponding guest, then a number of steps are performed to complete the forwarding of the adapter event notification to the guest. For example, if the guest AISB address in the GAIT entry does not include a defined value (e.g., all zeros), the guest AISB address and the guest AISB offset are used to set the guest AISB to one.

Further, the guest interruption subclass in the GISA designation in the GAIT entry is used to make the interruption pending in the GISA for the guest. In accordance with an aspect of the present invention, as part of this process, the interruption mode is set for the adapter function (i.e., the ISC). In one example, interruption mode controls are provided in the guest interruption state area (GISA) for pageable guests. As described above, the guest interruption state area is where pending adapter interruptions are queued for pageable guests, and in accordance with an aspect of the present invention, the GISA is extended to include two bit masks—one for single interruption mode (SIMM) and one for no interruptions mode (NIMM). This allows interruption suppression to be managed for a virtually unlimited number of guests, since the state is tracked in a per-guest data structure in host memory rather than in dedicated per-guest hardware. (One or more aspects of the present invention pertain to guests without dedicated interruption hardware.)

In this particular example, each mask has one bit per guest interruption subclass. The following represents an example of the interruption mode for the guest ISC:

SIMM.isc=0—all-interruptions mode;
SIMM.isc=1, NIMM.isc=0—single-interruption mode; and
SIMM.isc=1, NIMM.isc=1—no-interruptions mode.

To set the single and all interruption mode controls, the Set Interruption Controls instruction is used. It is interpreted by performing an interlocked update on these masks and the interruption pending mask (IPM), which serializes against other accesses to the GISA. As an example, to set the all interruptions mode for a given ISC, the bit position indexed by the ISC in the SIMM and NIMM fields of the GISA are set to zero. Further, to set the single interruption mode, the bit position indexed by the ISC in the SIMM field is set to one and in the NIMM field to zero. For the no interruptions mode, the bit position indexed by the ISC in the SIMM and NIMM fields are set to 1.

When an adapter interruption is made pending for an ISC in the GISA, the following bits are interrogated and updated as appropriate:

If SIMM.isc=0 (all interruptions mode), the interruption is made pending in IPM.isc, and host alerting is performed if requested by IAM.isc. The SIMM and NIMM bits are left unchanged. (Interruptions posted in all interruption mode leave the mode unchanged.)

If SIMM.isc=1 and NIMM.isc=0 (single interruption mode), the interruption is made pending in IPM.isc, and host alerting is performed, if requested by IAM.isc. In addition, NIMM.isc is also set to 1 at this time. This reflects a transition from single to no interruptions mode on posting an interruption.

If SIMM.isc=1 and NIMM.isc=1 (no interruptions mode), then the interruption request is ignored. No change is made to the IPM, IAM, SIMM, or NIMM fields in the GISA.

The inspection and update to SIMM and NIMM are incorporated into the existing interlocked updated used to post the interruption. This ensures that a consistent state is maintained, and serializes the posting of the interruption against other GISA activity such as interruption presentation or SIC interpretation.

In addition to the above, as part of forwarding the adapter event notification to the guest, if host alerting is requested for the GISC (e.g., the bit corresponding to the GISC in the interruption alerting mask (IAM) of the GISA is set to one), a host alerting adapter interruption is made pending.

The setting of the IPM bit is equivalent to the CPU's pending indicator and whenever a guest CPU enables for the ISC, the interruption is presented to the guest CPU absent host intervention. At the time the IPM bit is set to one, the bit specifying that an adapter interruption is pending for PCI functions is set in the adapter interruption source mask corresponding to the GISC.

Figure 7:
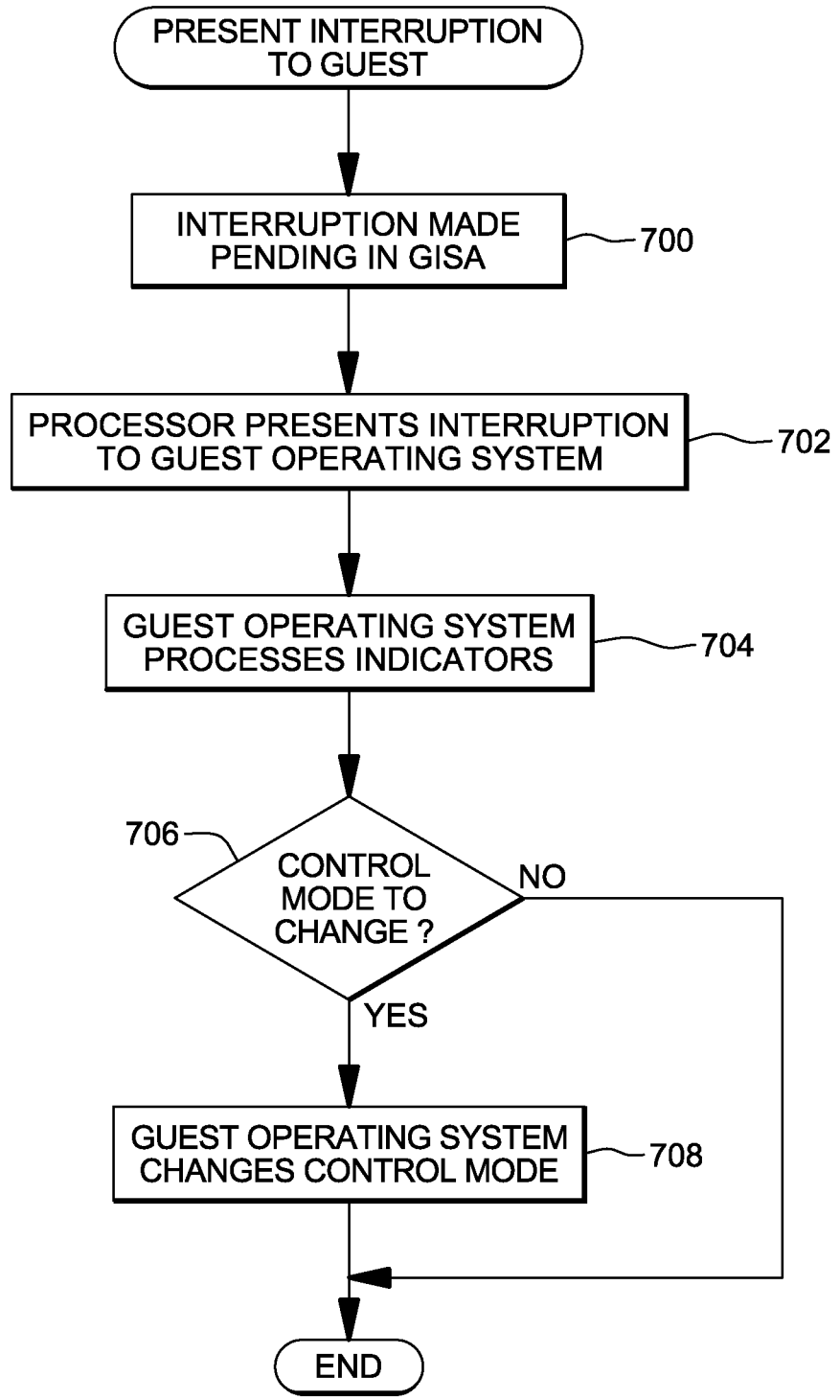
FIG. 7 depicts one embodiment of the logic to control the rate at which interrupts are processed by a guest, in accordance with an aspect of the present invention.
Figure 8:
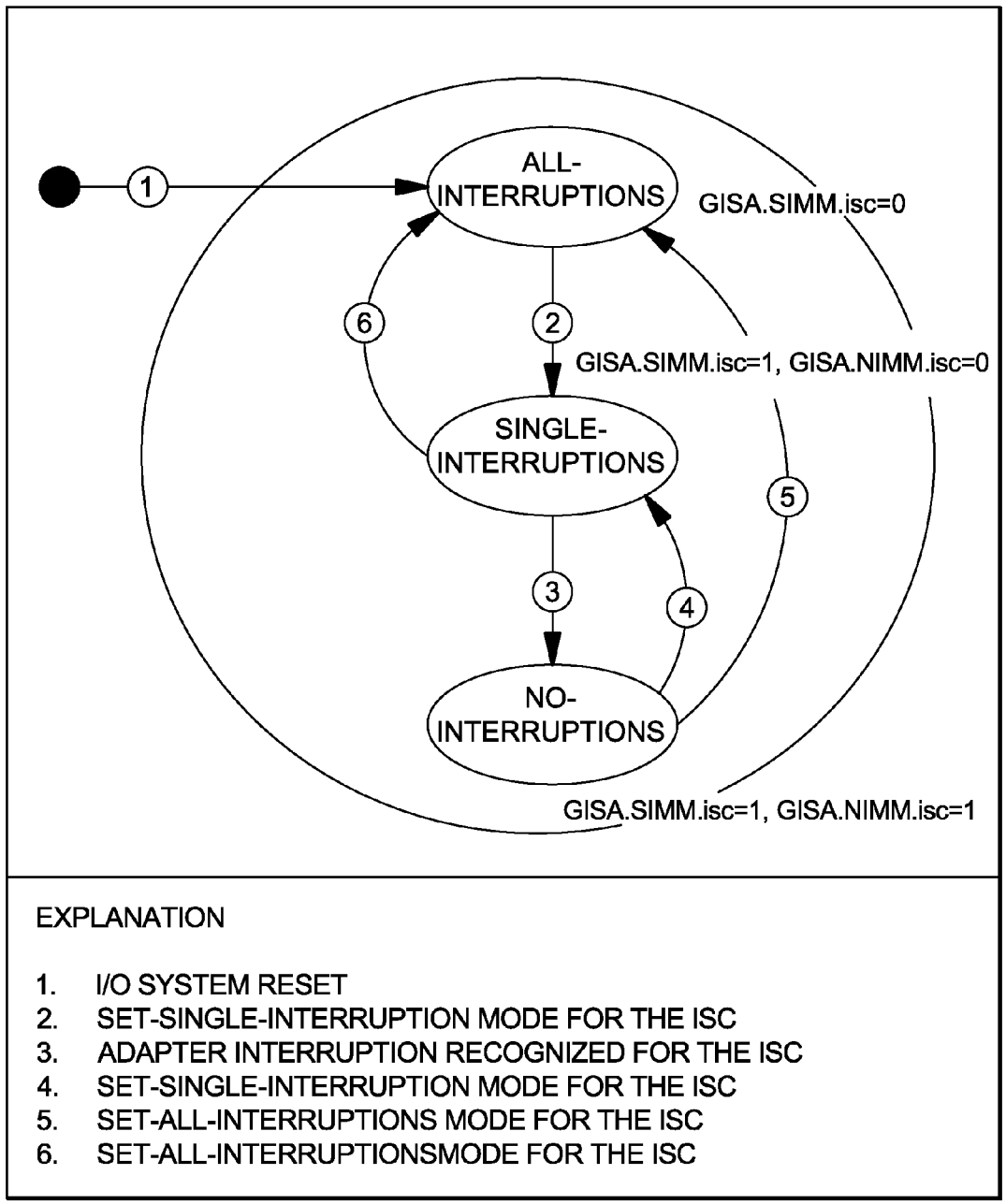
FIG. 8 depicts one embodiment of the state transition diagram of FIG. 4 further depicting transitioning from one mode to another in a virtual environment, in accordance with an aspect of the present invention.

Responsive to setting the IPM in the GISA, a processor enabled for the guest ISC determines that this indicator has been set and presents the interruption to the guest operating system. This processing is described further with reference to FIG. 7. Initially, the interruption is made pending in the GISA, as described above, STEP 700. A processor polling on this indicator determines that the bit has been set, and when it is enabled, it presents the interruption to the operating system, STEP 702. Responsive to receiving this indication, the operating system begins processing any set AISB and AIBV indicators, as described above, STEP 704. During this processing, the operating system determines whether the interruptions control mode is to be changed, STEP 706. That is, if it is keeping pace with processing the set indicators, then it does not make a change. However, if the operating system determines that another interrupt request is to be made pending, then it changes the control mode using, for instance, the Set Interruption Controls instruction, as described above, STEP 708. This controls the rate of interrupt processing.

Figure 9A:
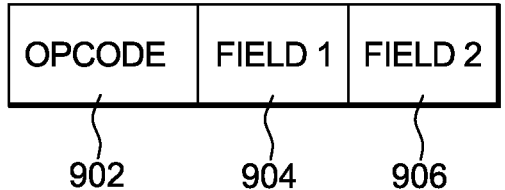
FIG. 9A depicts one embodiment of a Modify PCI Function Controls instruction used in accordance with an aspect of the present invention.

Further details regarding the Modify PCI Function Controls instruction used to register adapter interruptions is described herein. Referring to FIG. 9A, a Modify PCI Function Controls instruction 900 includes, for instance, an op code 902 indicating the Modify PCI Function Controls instruction; a first field 904 specifying a location at which various information is included regarding the adapter function for which the operational parameters are being established; and a second field 906 specifying a location from which a PCI function information block (FIB) is fetched. The contents of the locations designated by Fields 1 and 2 are further described below.

Figure 9B:
FIG. 9B depicts one embodiment of a field used by the Modify PCI Function Controls instruction of FIG. 9A, in accordance with an aspect of the present invention.

In one embodiment, Field 1 designates a general register that includes various information. As shown in FIG. 9B, the contents of the register include, for instance, a function handle 910 that identifies the handle of the adapter function on behalf of which the modify instruction is being performed; an address space 912 designating an address space in system memory associated with the adapter function designated by the function handle; an operation control 914 which specifies the operation to be performed for the adapter function; and status 916 which provides status regarding the instruction when the instruction completes with a predefined code.

In one embodiment, the function handle includes, for instance, an enable indicator indicating whether the handle is enabled, a function number that identifies an adapter function (this is a static identifier and may be used to index into a function table); and an instance number specifying the particular instance of this function handle. There is one function handle for each adapter function, and it is used to locate a function table entry (FTE) within the function table. Each function table entry includes operational parameters and/or other information associated with its adapter function. As one example, a function table entry includes:

Instance Number: This field indicates a particular instance of the adapter function handle associated with the function table entry;

Device Table Entry (DTE) Index 1 . . . n: There may be one or more device table indices, and each index is an index into a device table to locate a device table entry (DTE). There are one or more device table entries per adapter function, and each entry includes information associated with its adapter function, including information used to process requests of the adapter function (e.g., DMA requests, MSI requests) and information relating to requests associated with the adapter function (e.g., PCI instructions). Each device table entry is associated with one address space within system memory assigned to the adapter function. An adapter function may have one or more address spaces within system memory assigned to the adapter function.

Busy Indicator: This field indicates whether the adapter function is busy;

Permanent Error State Indicator: This field indicates whether the adapter function is in a permanent error state;

Recovery Initiated Indicator: This field indicates whether recovery has been initiated for the adapter function;

Permission Indicator: This field indicates whether the operating system trying to control the adapter function has authority to do so;

Enable Indicator: This field indicates whether the adapter function is enabled (e.g., 1=enabled, 0=disabled);

Requestor Identifier (RID): This is an identifier of the adapter function, and includes, for instance, a bus number, a device number and a function number.

In one example, this field is used for accesses of a configuration space of the adapter function. (Memory of an adapter may be defined as address spaces, including, for instance, a configuration space, an I/O space, and/or one or more memory spaces.) In one example, the configuration space may be accessed by specifying the configuration space in an instruction issued by the operating system (or other configuration) to the adapter function. Specified in the instruction is an offset into the configuration space and a function handle used to locate the appropriate function table entry that includes the RID. The firmware receives the instruction and determines it is for a configuration space. Therefore, it uses the RID to generate a request to the I/O hub, and the I/O hub creates a request to access the adapter. The location of the adapter function is based on the RID, and the offset specifies an offset into the configuration space of the adapter function.

Base Address Register (BAR) (1 to n): This field includes a plurality of unsigned integers, designated as $BAR_0$-$BAR_n$, which are associated with the originally specified adapter function, and whose values are also stored in the base address registers associated with the adapter function. Each BAR specifies the starting address of a memory space or I/O space within the adapter function, and also indicates the type of address space, that is whether it is a 64 or 32 bit memory space, or a 32 bit I/O space, as examples;

In one example, it is used for accesses to memory space and/or I/O space of the adapter function. For instance, an offset provided in an instruction to access the adapter function is added to the value in the base address register associated with the address space designated in the instruction to obtain the address to be used to access the adapter function. The address space identifier provided in the instruction identifies the address space within the adapter function to be accessed and the corresponding BAR to be used;

Size 1 . . . n: This field includes a plurality of unsigned integers, designated as $SIZE_0$-$SIZE_n$. The value of a Size field, when non-zero, represents the size of each address space with each entry corresponding to a previously described BAR.

Further details regarding BAR and Size are described below.

1. When a BAR is not implemented for an adapter function, the BAR field and its corresponding size field are both stored as zeros.
2. When a BAR field represents either an I/O address space or a 32-bit memory address space, the corresponding size field is non-zero and represents the size of the address space.

3. When a BAR field represents a 64-bit memory address space,
   a. The $BAR_n$ field represents the least significant address bits.
   b. The next consecutive $BAR_{n+1}$ field represents the most significant address bits.
   c. The corresponding $SIZE_n$ field is non-zero and represents the size of the address space.
   d. The corresponding $SIZE_{n+1}$ field is not meaningful and is stored as zero.

Internal Routing Information: This information is used to perform particular routing to the adapter. It includes, for instance, node, processor chip, and hub addressing information, as examples.

Status Indication: This provides an indication of, for instance, whether load/store operations are blocked or the adapter is in the error state, as well as other indications.

In one example, the busy indicator, permanent error state indicator, and recovery initiated indicator are set based on monitoring performed by the firmware. Further, the permission indicator is set, for instance, based on policy; and the BAR information is based on configuration information discovered during a bus walk by the processor (e.g., firmware of the processor). Other fields may be set based on configuration, initialization, and/or events. In other embodiments, the function table entry may include more, less or different information. The information included may depend on the operations supported by or enabled for the adapter function.

Figure 9C:
FIG. 9C depicts one embodiment of another field used by the Modify PCI Function Controls instruction of FIG. 9A, in accordance with an aspect of the present invention.

Referring to FIG. 9C, in one example, Field 2 designates a logical address 920 of a PCI function information block (FIB), which includes information regarding an associated adapter function. The function information block is used to update a device table entry and/or function table entry (or other location) associated with the adapter function. The information is stored in the FIB during initialization and/or configuration of the adapter, and/or responsive to particular events.

Figure 9D:
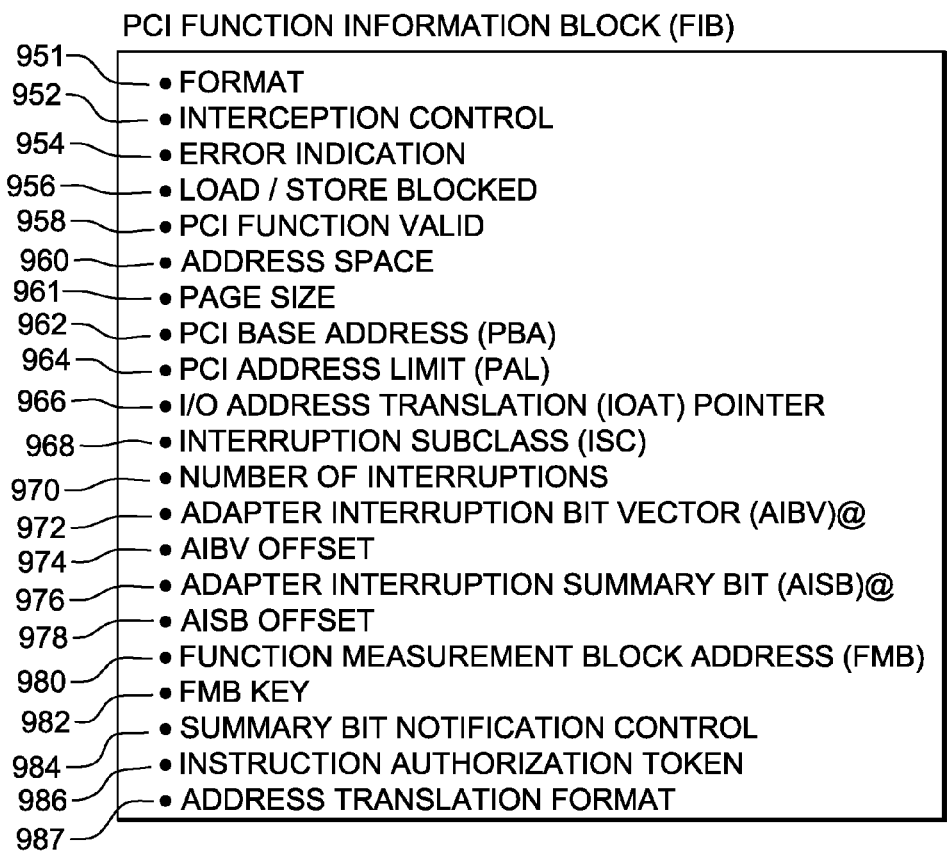
FIG. 9D depicts one embodiment of the contents of a function information block (FIB) used in accordance with an aspect of the present invention.

Further details regarding a function information block (FIB) are described with reference to FIG. 9D. In one embodiment, a function information block 950 includes the following fields:

Format 951: This field specifies the format of the FIB.

Interception Control 952: This field is used to indicate whether guest execution of specific instructions by a pageable mode guest results in instruction interception;

Error Indication 954: This field includes the error state indication for direct memory access and adapter interruptions. When the bit is set (e.g., 1), one or more errors have been detected while performing direct memory access or adapter interruption for the adapter function;

Load/Store Blocked 956: This field indicates whether load/store operations are blocked;

PCI Function Valid 958: This field includes an enablement control for the adapter function. When the bit is set (e.g., 1), the adapter function is considered to be enabled for I/O operations;

Address Space Registered 960: This field includes a direct memory access enablement control for an adapter function. When the field is set (e.g., 1) direct memory access is enabled;

Page Size 961: This field indicates the size of the page or other unit of memory to be accessed by a DMA memory access;

PCI Base Address (PBA) 962: This field is a base address for an address space in system memory assigned to the adapter function. It represents the lowest virtual address that an adapter function is allowed to use for direct memory access to the specified DMA address space;

PCI Address Limit (PAL) 964: This field represents the highest virtual address that an adapter function is allowed to access within the specified DMA address space;

Input/Output Address Translation Pointer (IOAT) 966: The input/output address translation pointer designates the first of any translation tables used by a PCI virtual address translation, or it may directly designate the absolute address of a frame of storage that is the result of translation;

Interruption Subclass (ISC) 968: This field includes the interruption subclass used to present adapter interruptions for the adapter function;

Number of Interruptions (NOI) 970: This field designates the number of distinct interruption codes accepted for an adapter function. This field also defines the size, in bits, of the adapter interruption bit vector designated by an adapter interruption bit vector address and adapter interruption bit vector offset fields;

Adapter Interruption Bit Vector Address (AIBV) 972: This field specifies an address of the adapter interruption bit vector for the adapter function. This vector is used in interrupt processing;

Adapter Interruption Bit Vector Offset 974: This field specifies the offset of the first adapter interruption bit vector bit for the adapter function;

Adapter Interruption Summary Bit Address (AISB) 976: This field provides an address designating the adapter interruption summary bit, which is optionally used in interrupt processing;

Adapter Interruption Summary Bit Offset 978: This field provides the offset into the adapter interruption summary bit vector;

Function Measurement Block (FMB) Address 980: This field provides an address of a function measurement block used to collect measurements regarding the adapter function;

Function Measurement Block Key 982: This field includes an access key to access the function measurement block;

Summary Bit Notification Control 984: This field indicates whether there is a summary bit vector being used;

Instruction Authorization Token 986: This field is used to determine whether a pageable storage mode guest is authorized to execute PCI instructions without host intervention; and Address Translation Format 987: This field indicates a selected format for address translation of the highest level translation table to be used in translation (e.g., segment table, region 3rd, etc).

The function information block designated in the Modify PCI Function Controls instruction is used to modify a selected device table entry, a function table entry and/or other firmware controls associated with the adapter function designated in the instruction. By modifying the device table entry, function table entry and/or other firmware controls, certain services are provided for the adapter. These services include, for instance, adapter interruptions; address translations; reset error state; reset load/store blocked; set function measurement parameters; and set interception control.

One embodiment of the logic associated with the Modify PCI Function Controls instruction is described with reference to FIG. 10. In one example, the instruction is issued by an operating system (or other configuration) and executed by the processor (e.g., firmware) executing the operating system. In the examples herein, the instruction and adapter functions are PCI based. However, in other examples, a different adapter architecture and corresponding instructions may be used.

In one example, the operating system provides the following operands to the instruction (e.g., in one or more registers designated by the instruction): the PCI function handle; the DMA address space identifier; an operation control; and an address of the function information block.

Figure 10:
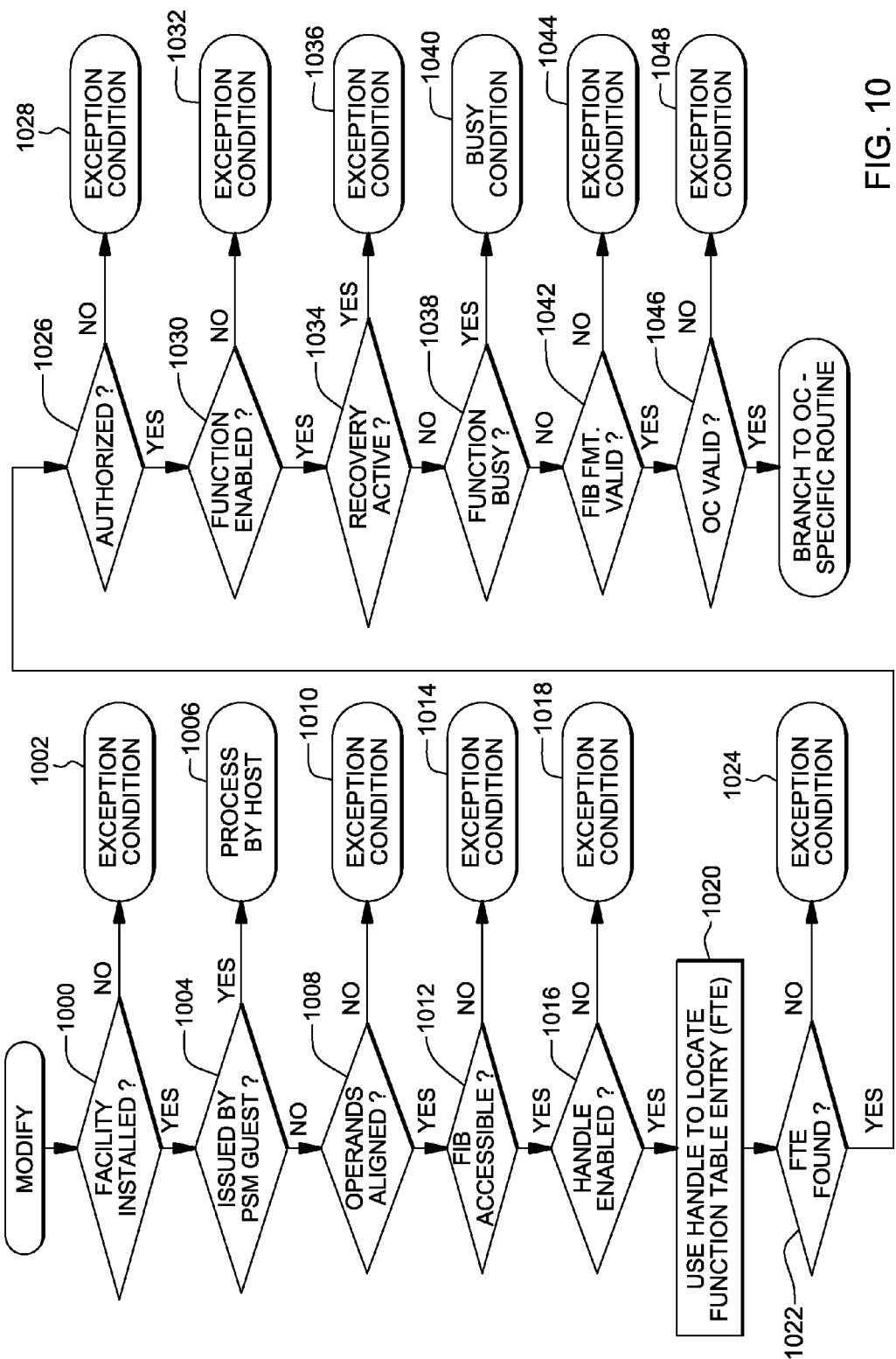
FIG. 10 depicts one embodiment of an overview of the logic of the Modify PCI Function Controls instruction, in accordance with an aspect of the present invention.

Referring to FIG. 10, initially, a determination is made as to whether the facility allowing for a Modify PCI Function Controls instruction is installed, INQUIRY 1000. This determination is made by, for instance, checking an indicator stored in, for instance, a control block. If the facility is not installed, an exception condition is provided, STEP 1002. Otherwise, a determination is made as to whether the instruction was issued by a pageable storage mode guest (or other guest), INQUIRY 1004. If yes, the host operating system will emulate the operation for that guest, STEP 1006.

Otherwise, a determination is made as to whether one or more of the operands are aligned, INQUIRY 1008. For instance, a determination is made as to whether the address of the function information block is on a double word boundary. In one example, this is optional. If the operands are not aligned, then an exception condition is provided, STEP 1010. Otherwise, a determination is made as to whether the function information block is accessible, INQUIRY 1012. If not, then an exception condition is provided, STEP 1014. Otherwise, a determination is made as to whether the handle provided in the operands of the Modify PCI Function Controls instruction is enabled, INQUIRY 1016. In one example, this determination is made by checking an enable indicator in the handle. If the handle is not enabled, then an exception condition is provided, STEP 1018.

If the handle is enabled, then the handle is used to locate a function table entry, STEP 1020. That is, at least a portion of the handle is used as an index into the function table to locate the function table entry corresponding to the adapter function for which operational parameters are to be established.

A determination is made as to whether the function table entry was found, INQUIRY 1022. If not, then an exception condition is provided, STEP 1024. Otherwise, if the configuration issuing the instruction is a guest, INQUIRY 1026, then an exception condition (e.g., interception to the host) is provided, STEP 1028. This inquiry may be ignored if the configuration is not a guest or other authorizations may be checked, if designated.

A determination is then made as to whether the function is enabled, INQUIRY 1030. In one example, this determination is made by checking an enable indicator in the function table entry. If it is not enabled, then an exception condition is provided, STEP 1032.

If the function is enabled, then a determination is made as to whether recovery is active, INQUIRY 1034. If recovery is active as determined by a recovery indicator in the function table entry, then an exception condition is provided, STEP 1036. However, if recovery is not active, then a further determination is made as to whether the function is busy, INQUIRY 1038. This determination is made by checking the busy indicator in the function table entry. If the function is busy, then a busy condition is provided, STEP 1040. With the busy condition, the instruction can be retried, instead of dropped.

If the function is not busy, then a further determination is made as to whether the function information block format is valid, INQUIRY 1042. For instance, the format field of the FIB is checked to determine if this format is supported by the system. If it is invalid, then an exception condition is provided, STEP 1044. If the function information block format is valid, then a further determination is made as to whether the operation control specified in the operands of the instruction is valid, INQUIRY 1046. That is, is the operation control one of the specified operation controls for this instruction. If it is invalid, then an exception condition is provided, STEP 1048. However, if the operation control is valid, then processing continues with the specific operation control being specified.

In one example, the operation control is a register adapter interruptions operation, which is used for controlling adapter interruptions. Responsive to this operation control, the adapter function parameters relevant to adapter interruptions are set in the device table entry based on the appropriate contents of the function information block.

One embodiment of the logic associated with this operation is described with reference to FIG. 11. As one example, the operands for this operation, which are obtained from the function information block, include for instance: an interruption subclass (ISC); number of interruptions allowed (NOI); an adapter interruption bit vector offset (AIBVO); a summary notification (S); an adapter interruption summary bit vector offset (ABVSO); an adapter interruption bit vector (AIBV) address; and an adapter interruption summary bit vector (AISB) address.

Figure 11:
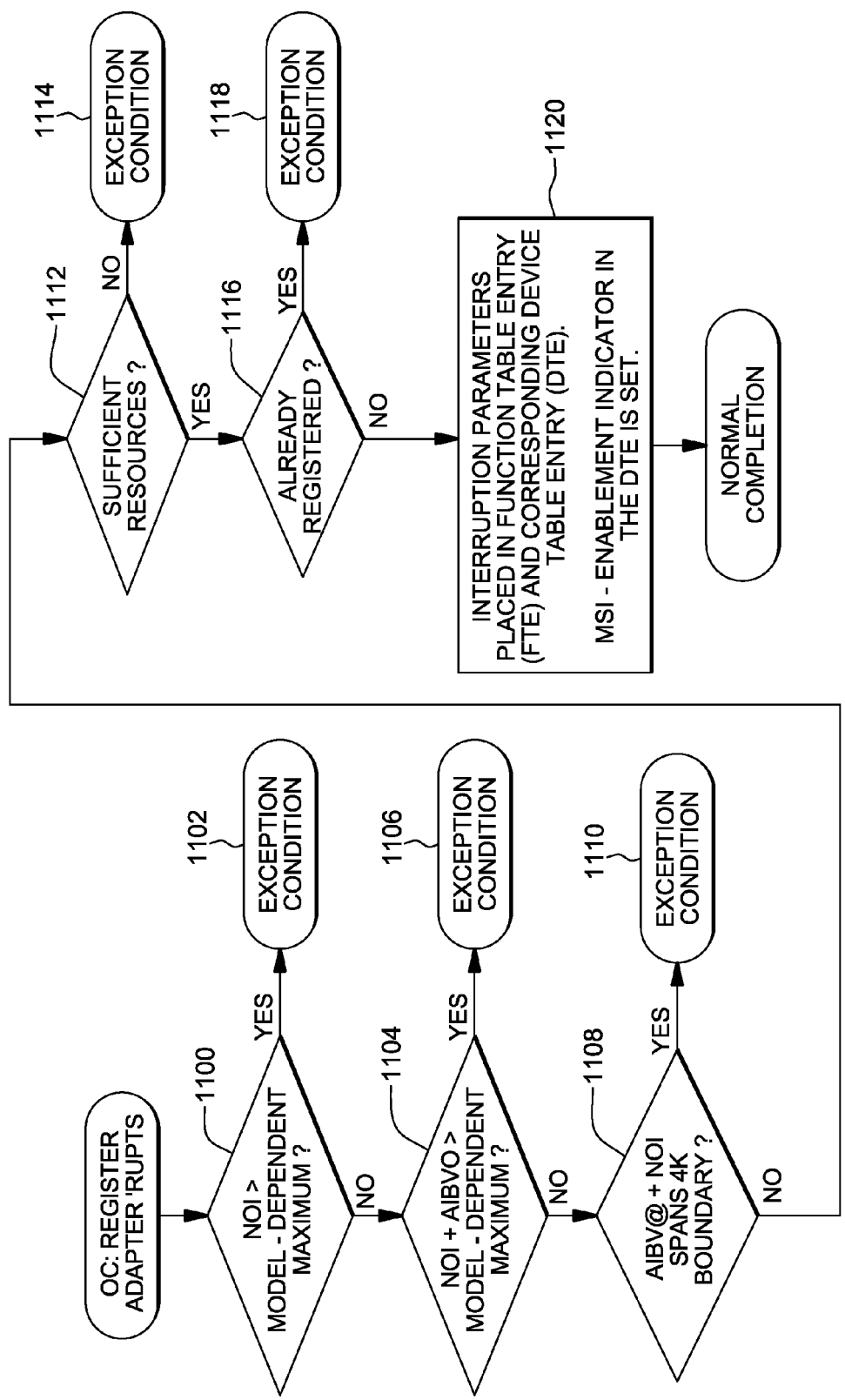
FIG. 11 depicts one embodiment of the logic associated with a register adapter interruptions operation that may be specified by the Modify PCI Function Controls instruction, in accordance with an aspect of the present invention.

Referring to FIG. 11, initially, a determination is made as to whether the number of interruptions (NOIs) specified in the FIB is greater than a model-dependent maximum, INQUIRY 1100. If so, then an exception condition is provided, STEP 902. However, if the number of interruptions is not greater than the model-dependent maximum, then a further determination is made as to whether the number of interruptions added to the adapter interruption bit vector offset (NOI+AIBVO) is greater than a model-dependent maximum, INQUIRY 1104. If so, then an exception condition is provided, STEP 1106. If the NOI plus the AIBVO is not greater than a model-dependent maximum, then a further determination is made as to whether the AIBV address plus the NOI spans a 4 k boundary, INQUIRY 1108. If it does span the 4 k boundary, then an exception condition is provided, STEP 1110. Otherwise, a determination is made as to whether sufficient resources are available for any resources needed, STEP 1112. If there are not sufficient resources, then an exception condition is provided, STEP 1114.

Otherwise, a determination is made as to whether adapter interruptions are already registered for this function, STEP 1116. In one embodiment, this would be determined by checking one or more of the parameters (e.g., in the DTE/FTE). In particular, parameters associated with interruptions, such as NOI, are checked. If the fields are populated, then the adapter is registered for interrupts. If the adapter is already registered, then an exception condition is provided, STEP 1118. Otherwise, the interruption parameters are obtained from the FIB and placed in the device table entry and optionally, in the corresponding function table entry (FTE) (or other specified location). Also, an MSI enablement indicator is set in the DTE, STEP 1120. That is, the PCI function parameters relevant to adapter interruption are set in the DTE and optionally, in the FTE based on the information retrieved from the function information block. These parameters include, for instance, the ISC, NOI, AIBVO, S, AIBVSO, AIBV address and the AISB address.

In addition to the above, another operation control that can be specified is an unregister adapter interruptions operation, an example of which is described with reference to FIG. 12. With this operation, the adapter function parameters relevant to adapter interruption are reset.

Figure 12:
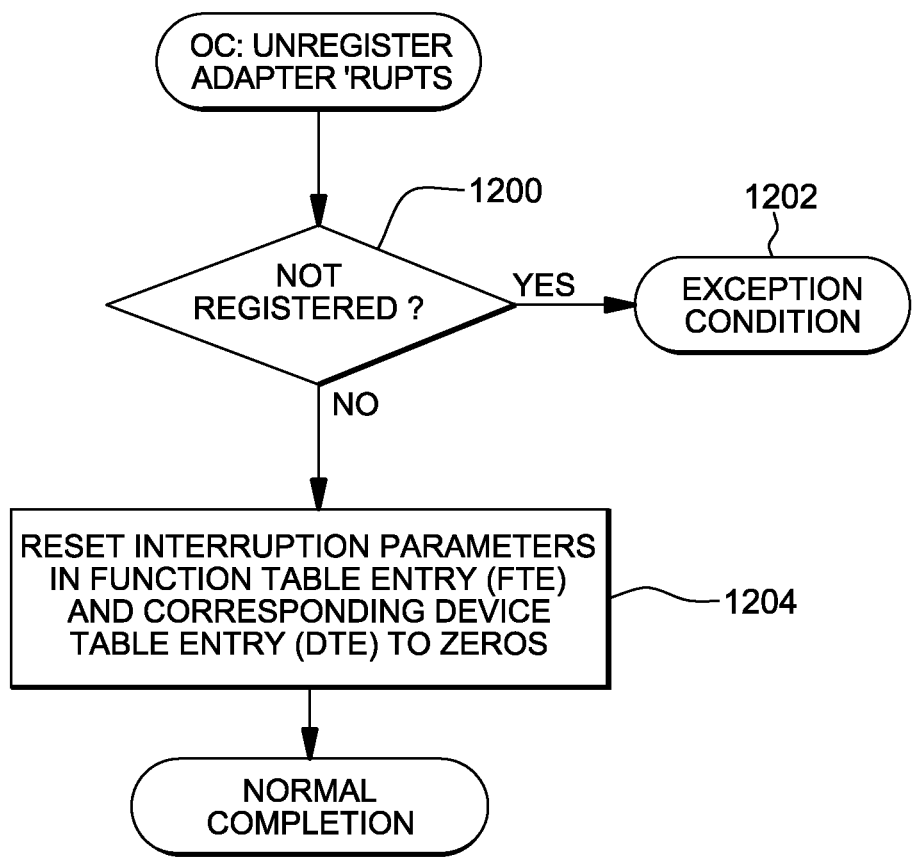
FIG. 12 depicts one embodiment of the logic associated with an unregister adapter interruptions operation that may be specified by the Modify PCI Function Controls instruction, in accordance with an aspect of the present invention.

Referring to FIG. 12, initially, a determination is made as to whether the adapter specified by the function handle is registered for interrupts, INQUIRY 1200. If not, then an exception condition is provided, STEP 1202. Otherwise, the interruption parameters in the function table entry (or other location) and corresponding device table entry are set to zeros, INQUIRY 1204. In one example, these parameters include the ISC, NOI, AIBVO, S, AIBSO, AIBV address and AISB address.

Figure 13A:
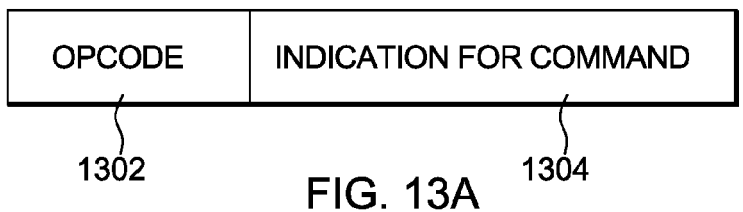
FIG. 13A depicts one embodiment of a Call Logical Processor instruction used in accordance with an aspect of the present invention.

As described above, in one embodiment, to obtain the information regarding an adapter function, a Call Logical Processor instruction is used. One embodiment of this instruction is depicted in FIG. 13A. As shown, in one example, a Call Logical Processor (CLP) instruction 1300 includes an operation code 1302 indicating that it is the Call Logical Processor instruction; and an indication for a command 1304. In one example, this indication is an address of a request block that describes the command to be performed, and the information in the request block is dependent on the command. Examples of request blocks and corresponding response blocks for various commands are described with reference to FIGS. 13B-15B.

Figure 13B:
FIG. 13B depicts one embodiment of a request block used by the Call Logical Processor instruction of FIG. 13A for a list operation, in accordance with an aspect of the present invention.

Referring initially to FIG. 13B, a request block for a list PCI functions command is provided. The list PCI functions command is used to obtain a list of PCI functions that are assigned to the requesting configuration (e.g., the requesting operating system). A request block 1320 includes a number of parameters, such as, for instance:
- Length field 1322: This field indicates the length of the request block;
- Command Code 1324: This field indicates the list PCI functions command; and
- Resume Token 1326: This field is an integer that is used to either start a new list PCI functions command or resume a previous list PCI functions command, as described in further detail below.

When the resume token field in the command request block includes, for instance, a value of zero, a new list of PCI functions is requested. When the resume token field includes, for instance, a non-zero value, which was returned from a previous list PCI functions command, a continuation of a previous list of PCI functions is requested.

Figure 13C:
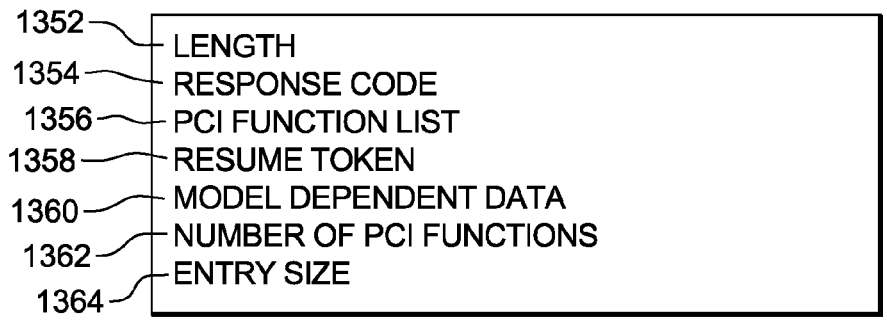
FIG. 13C depicts one embodiment of a response block for the list operation of FIG. 13B, in accordance with an aspect of the present invention.

Responsive to issuing and processing the Call Logical Processor instruction for a list PCI functions command, a response block is returned. One embodiment of the response block is depicted in FIG. 13C. In one example, a response block 1350 for a list PCI functions command includes:
- Length field 1352: This field indicates the length of the response block;
- Response Code 1354: This field indicates a status of the command;
- PCI Function List 1356: This field indicates a list of one or more PCI functions available to the requesting operating system;
- Resume Token 1358: This field indicates whether a continuation of a previous list of PCI functions is requested. In one example, when the resume token in the request block and the resume token in the response block are zero, all PCI functions assigned to the requesting configuration are represented in the PCI function list; if the resume token in the request block is zero and the resume token in the response block is not zero, additional PCI functions assigned to the request configuration may exist that have not been represented in the list; if the resume token in the request block is not zero and the resume token in the response block is zero, from the resume point, remaining PCI functions assigned to the requesting configuration are represented in the list; when both the resume tokens in the request and response block are not zero from the resume point, additional PCI functions assigned to the requesting configuration may exist that have not been represented in any associated PCI function list. The resume token remains valid for an indefinite period of time after being returned, but it may be invalid due to a variety of model dependent reasons, including system load elapse time;
- Model Dependent Data 1360: This field includes data that depends on the system;
- Number of PCI Functions 1362: This field indicates the maximum number of PCI functions supported by the facility; and
- Entry Size 1364: This field indicates the size of each entry in the PCI function list.

Figure 13D:
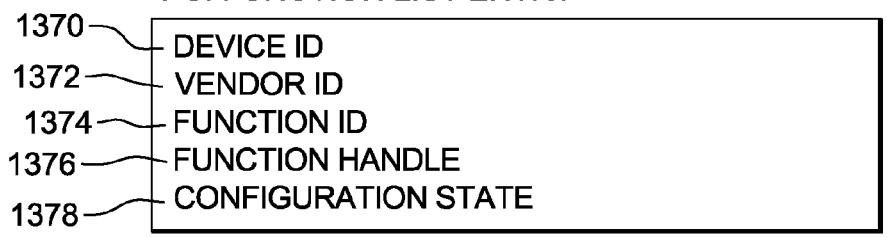
FIG. 13D depicts one embodiment of a function list entry used in accordance with an aspect of the present invention.

Further details regarding the PCI function list are described with reference to FIG. 13D. In one example, the PCI function list includes a plurality of entries and each entry 1356 includes the following information, as an example:
- Device ID 1370: This field indicates the I/O adapter associated with the corresponding PCI function;
- Vendor ID 1372: This field identifies the manufacturer of the I/O adapter associated with the corresponding PCI function;
- Function Identifier 1374: This field includes a persistent identifier of the PCI function;
- Function Handle 1376: This field identifies a PCI function. The PCI function handle stored is a general handle when a specified bit of the handle is zero, and it is an enabled handle when that bit is one. If the PCI function is disabled, a general PCI function handle is stored. If the PCI function is enabled, an enabled PCI function handle is stored. A PCI function handle is not, in one example, persistent beyond an IPL, which differs from the PCI function ID, which is persistent and is set for the life of the I/O configuration definition; and
- Configuration State 1378: This field indicates the state of the PCI function. When this indicator is, for instance, zero, the state is standby, and when, for instance, one, the state is configured. When in standby, the PCI function handle is the general PCI function handle, and when configured, it is either the general or enabled PCI function handle depending on whether the PCI function is enabled.

Subsequent to obtaining the list of adapter functions, information may be obtained regarding the attributes of a selected function as designated by a specified PCI function handle. This information may be obtained by issuing a CLP instruction with a query function command.

Figure 14A:
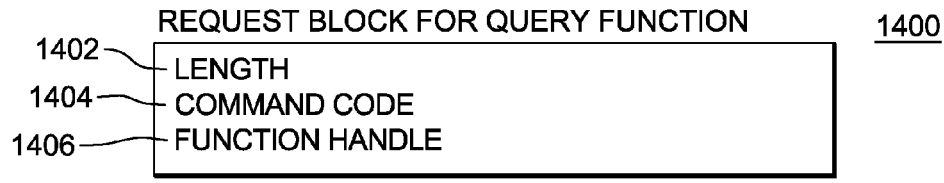
FIG. 14A depicts one embodiment of a request block used by the Call Logical Processor instruction of FIG. 13A for a query function operation, in accordance with an aspect of the present invention.

One embodiment of the request block for a query PCI function command is described with reference to FIG. 14A. In one example, request block 1400 includes, for instance:
- Length field 1402: This field indicates the length of the request block;
- Command Code 1404: This field indicates the query PCI function command; and
- Function Handle 1406: This field includes the PCI function handle (e.g., general or enabled) that designates the PCI function to be queried.

Figure 14B:
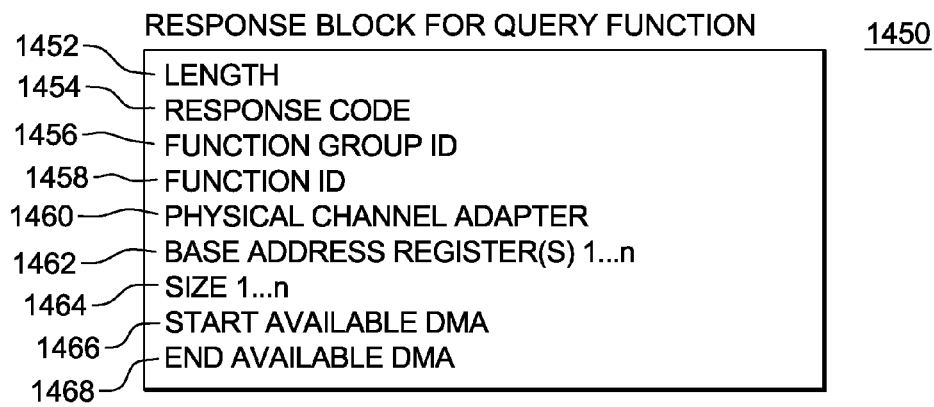
FIG. 14B depicts one embodiment of a response block for the query function operation of FIG. 14A, in accordance with an aspect of the present invention.

Responsive to issuing the Call Logical Processor instruction for the query PCI function command, a response block is returned. One embodiment of the response block is depicted in FIG. 14B. In one example, a response block 1250 includes the following:
- Length 1452: This field indicates the length of the response block;

Response Code 1454: This field indicates a status of the command;

Function Group ID 1456: This field indicates the PCI function group identifier. A PCI function group identifier is used to associate a group of PCI functions with a set of attributes (also referred to herein as characteristics). Each PCI function with the same PCI function group identifier has the same set of attributes;

Function ID 1458: The PCI function id is a persistent identifier of the PCI function originally specified by the PCI function handle and is set for the life of the I/O configuration definition;

Physical Channel Adapter 1460: This value represents a model dependent identification of the location of the physical I/O adapter which corresponds to the PCI function;

Base Address Registers (BARs) 1 . . . n 1462: This field includes a plurality of unsigned integers, designated as $BAR_0\text{-}BAR_n$, which are associated with the originally specified PCI function, and whose values are also stored in the base address registers associated with the PCI function. Each BAR specifies the starting address of a memory space or I/O space within the adapter, and also indicates the type of address space, that is whether it is a 64 or 32 bit memory space, or a 32 bit I/O space, as examples;

Size 1 . . . n 1464: This field includes a plurality of unsigned integers, designated as $SIZE_0\text{-}SIZE_n$. The value of a Size field, when non-zero, represents the size of each address space with each entry corresponding to a previously described BAR.

Start Available DMA 1466: This field includes an address which indicates the beginning of a range of PCI addresses that are available for DMA operations;

End Available DMA 1468: This field includes a value which indicates the end of a range of PCI addresses that are available for DMA operations.

In addition to obtaining attributes regarding the specific adapter function, attributes may also be obtained regarding the group that includes this function. These common attributes may be obtained from issuing a CLP instruction with a query PCI function group command. This command is used to obtain a set of characteristics that are supported for a group of one or more PCI functions designated by the specified PCI function group identifier. A PCI function group identifier is used to associate a group of PCI functions with the same set of characteristics. One embodiment of request block for the query PCI function group command is described with reference to FIG. 15A. In one example, request block 1500 includes the following:

Length field 1502: This field indicates the length of the request block;

Command Code 1504: This field indicates the query PCI function group command; and Function Group ID 1506: This field specifies the PCI function group identifier for which attributes are to be obtained.

Figure 15A:
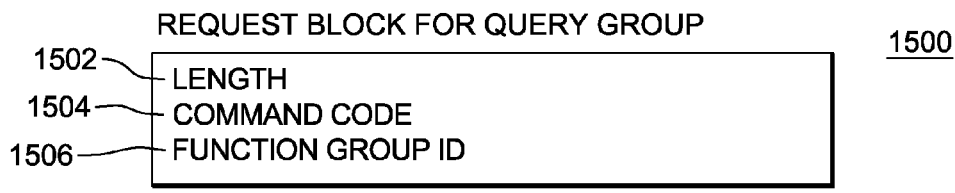
FIG. 15A depicts one embodiment of a request block used by the Call Logical Processor instruction of FIG. 13A for a query group operation, in accordance with an aspect of the present invention.
Figure 15B:
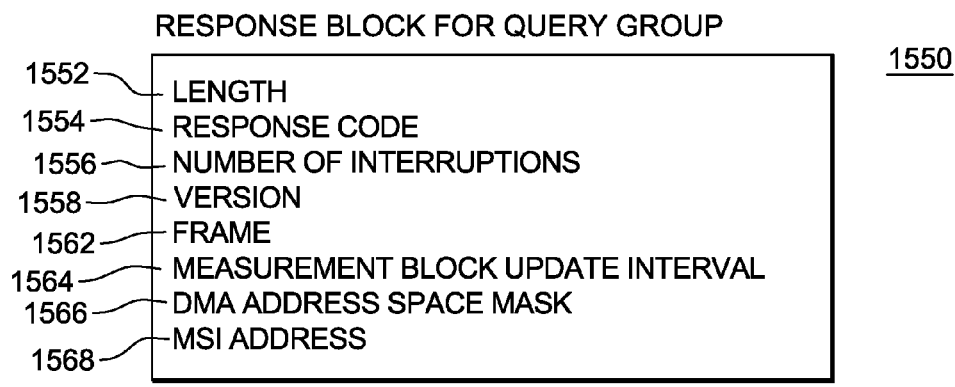
FIG. 15B depicts one embodiment of a response block for the query group operation of FIG. 15A, in accordance with an aspect of the present invention.

Responsive to issuing and processing the Call Logical Processor instruction with a query PCI function group command, a response block is returned. One embodiment of the response block is depicted in FIG. 15B. In one example, a response block 1550 includes:

Length Field 1552: This field indicates the length of the response block;

Response Code 1554: This field indicates a status of the command;

Number of Interruptions 1556: This field indicates the maximum number of consecutive MSI vector numbers (i.e., interruption event indicators) that are supported by the PCI facility for each PCI function in the specified PCI function group. The possible valid values of the number of interruptions are in the range of zero to 2,048, in one example;

Version 1558: This field indicates the version of the PCI specification that is supported by the PCI facility to which the group of PCI functions designated by the specified PCI group identifier are attached;

Frame 1562: This field indicates the frame (or page) sizes supported for I/O address translation;

Measurement Block Update Interval 1564: This is a value indicating the approximate time interval (e.g., in milliseconds) at which the PCI function measurement block is updating;

DMA Address Space Mask 1566: This is a value used to indicate which bits in a PCI address are used to identify a DMA address space; and MSI Address 1568: This is a value that is to be used for message signal interruption requests.

The query list and function commands described above retrieve information from, for instance, the function table. At initialization time, or after a hot plug of an adapter, firmware performs a bus walk to determine the location of the adapter and determines its basic characteristics. This information is stored by the firmware into the function table entry (FTE) for each adapter. Accessibility to the adapter is determined based on policy set by a system administrator and is also set by firmware into the FTE. The query list and function commands can then retrieve this information and store it in their respective response blocks accessible to the operating system.

Further, the group information is based on a given system I/O infrastructure and the capabilities of the firmware and the I/O hub. This may be stored in the FTE or any other convenient location for later retrieval during the query processing. In particular, the query group command retrieves the information and stores it in its response block accessible to the operating system.

In accordance with an aspect of the present invention, fine-grained controls are provided to throttle the delivery of adapter interruptions to an operating system. These controls provide the operating system with the capability to control the number of interruptions pending for all CPUs, and therefore, presented. This further enables the number of CPUs running interruption handling tasks for PCI functions to be controlled. In one aspect, with one single execution of an instruction, for any CPUs enabled for a given ISC, an interruption can be processed by any of those enabled CPUs. An instruction does not need to be executed on each CPU.

In one example, a control is provided to the operating system that enables the operating system to suppress requests for additional adapter interruptions from adapter functions (e.g., of a specific type, such as PCI) for the entire configuration, responsive to recognition of a single adapter interruption request for an interruption subclass. This provides adapter interruption handling initiative on a single CPU. As long as the interruption handling on the single CPU is maintaining pace (e.g., within a defined range or based on thresholds) with the arrival of new adapter event indications, no additional adapter interruption is necessary. This reduces the context switching overhead that would be incurred by additional adapter interruptions.

However, if the operating system determines that adapter event notifications are arriving at a rate that is faster than can be currently handled, the controls allow the operating system to remove the adapter interruption suppression so that an additional adapter interruption request can be recognized by another CPU, thereby giving an additional initiative to adapter interruption handling.

Further, in another aspect, when the interruptions mode is the no interruptions mode and there is no more work for the operating system to perform (that is, when all the AISBs and AIBVs are zero), the operating system can choose to place the system back in single interruption mode or in all interruptions mode. This enables the operating system to perform other types of work until another interruption request is posted.

In the embodiments described herein, the adapters are PCI adapters. PCI, as used herein, refers to any adapters implemented according to a PCI-based specification as defined by the Peripheral Component Interconnect Special Interest Group (PCI-SIG), including but not limited to, PCI or PCIe. In one particular example, the Peripheral Component Interconnect Express (PCIe) is a component level interconnect standard that defines a bi-directional communication protocol for transactions between I/O adapters and host systems. PCIe communications are encapsulated in packets according to the PCIe standard for transmission on a PCIe bus. Transactions originating at I/O adapters and ending at host systems are referred to as upbound transactions. Transactions originating at host systems and terminating at I/O adapters are referred to as downbound transactions. The PCIe topology is based on point-to-point unidirectional links that are paired (e.g., one upbound link, one downbound link) to form the PCIe bus. The PCIe standard is maintained and published by the PCI-SIG.

Other applications filed on the same day include: U.S. Ser. No. 12/821,170, filed Jun. 23, 2010, entitled "Translation Of Input/Output Addresses To Memory Addresses," Craddock et al.; U.S. Ser. No. 12/821,171, filed Jun. 23, 2010, entitled "Runtime Determination Of Translation Formats For Adapter Functions," Craddock et al.; U.S. Ser. No. 12/821,172, filed Jun. 23, 2010, entitled "Resizing Address Spaces Concurrent To Accessing The Address Spaces," Craddock et al.; U.S. Ser. No. 12/821,174, filed Jun. 23, 2010, entitled "Multiple Address Spaces Per Adapter," Craddock et al.; U.S. Ser. No. 12/821,175, filed Jun. 23, 2010, entitled "Converting A Message Signaled Interruption Into An I/O Adapter Event Notification," Craddock et al.; U.S. Ser. No. 12/821,177, filed Jun. 23, 2010, entitled "Converting A Message Signaled Interruption Into An I/O Adapter Event Notification To A Guest Operating System," Brice et al.; U.S. Ser. No. 12/821,178, filed Jun. 23, 2010, entitled "Identification Of Types Of Sources Of Adapter Interruptions," Craddock et al.; U.S. Ser. No. 12/821,181, filed Jun. 23, 2010, entitled "Controlling The Selectively Setting Of Operational Parameters For An Adapter," Craddock et al.; U.S. Ser. No. 12/821,182, filed Jun. 23, 2010, entitled "Load Instruction for Communicating with Adapters," Craddock et al.; U.S. Ser. No. 12/821,184, filed Jun. 23, 2010, entitled "Controlling Access By A Configuration To An Adapter Function," Craddock et al.; U.S. Ser. No. 12/821,185, filed Jun. 23, 2010, entitled "Discovery By Operating System Of Information Relating To Adapter Functions Accessible To The Operating System," Coneski et al.; U.S. Ser. No. 12/821,187, filed Jun. 23, 2010, entitled "Enable/Disable Adapters Of A Computing Environment," Coneski et al.; U.S. Ser. No. 12/821,190, filed Jun. 23, 2010, entitled "Guest Access To Address Spaces Of Adapter," Craddock et al.; U.S. Ser. No. 12/821,191, filed Jun. 23, 2010, entitled "Managing Processing Associated With Hardware Events," Coneski et al.; U.S. Ser. No. 12/821,192, filed Jun. 23, 2010, entitled "Operating System Notification Of Actions To Be Taken Responsive To Adapter Events," Craddock et al.; U.S. Ser. No. 12/821,193, filed Jun. 23, 2010, entitled "Measurement Facility For Adapter Functions," Brice et al.; U.S. Ser. No. 12/821,194, filed Jun. 23, 2010, entitled "Store/Store Block Instructions for Communicating with Adapters," Craddock et al.; U.S. Ser. No. 12/821,224, filed Jun. 21, 2010, entitled "Associating Input/Output Device Requests With Memory Associated With A Logical Partition," Craddock et al.; U.S. Ser. No. 12/821,247, filed Jun. 23, 2010, entitled "Scalable I/O Adapter Function Level Error Detection, Isolation, And Reporting," Craddock et al.; U.S. Ser. No. 12/821,256, filed Jun. 23, 2010, entitled "Switch Failover Control In A Multiprocessor Computer System," Bayer et al.; U.S. Ser. No. 12/821,242, filed Jun. 23, 2010, entitled "A System And Method For Downbound I/O Expansion Request And Response Processing In A PCIe Architecture," Gregg et al.; U.S. Ser. No. 12/821,243, filed Jun. 23, 2010, entitled "Upbound Input/Output Expansion Request And Response Processing In A PCIe Architecture," Gregg et al.; U.S. Ser. No. 12/821,245, filed Jun. 23, 2010, entitled "A System And Method For Routing I/O Expansion Requests And Responses In A PCIe Architecture," Lais et al.; U.S. Ser. No. 12/821,239, filed Jun. 23, 2010, entitled "Input/Output (I/O) Expansion Response Processing In A Peripheral Component Interconnect Express (PCIe) Environment," Gregg et al.; U.S. Ser. No. 12/821,271, filed Jun. 23, 2010, entitled "Memory Error Isolation And Recovery In A Multiprocessor Computer System," Check et al.; and U.S. Ser. No. 12/821,248, filed Jun. 23, 2010, entitled "Connected Input/Output Hub Management," Bayer et al., each of which is hereby incorporated herein by reference in its entirety.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 16:
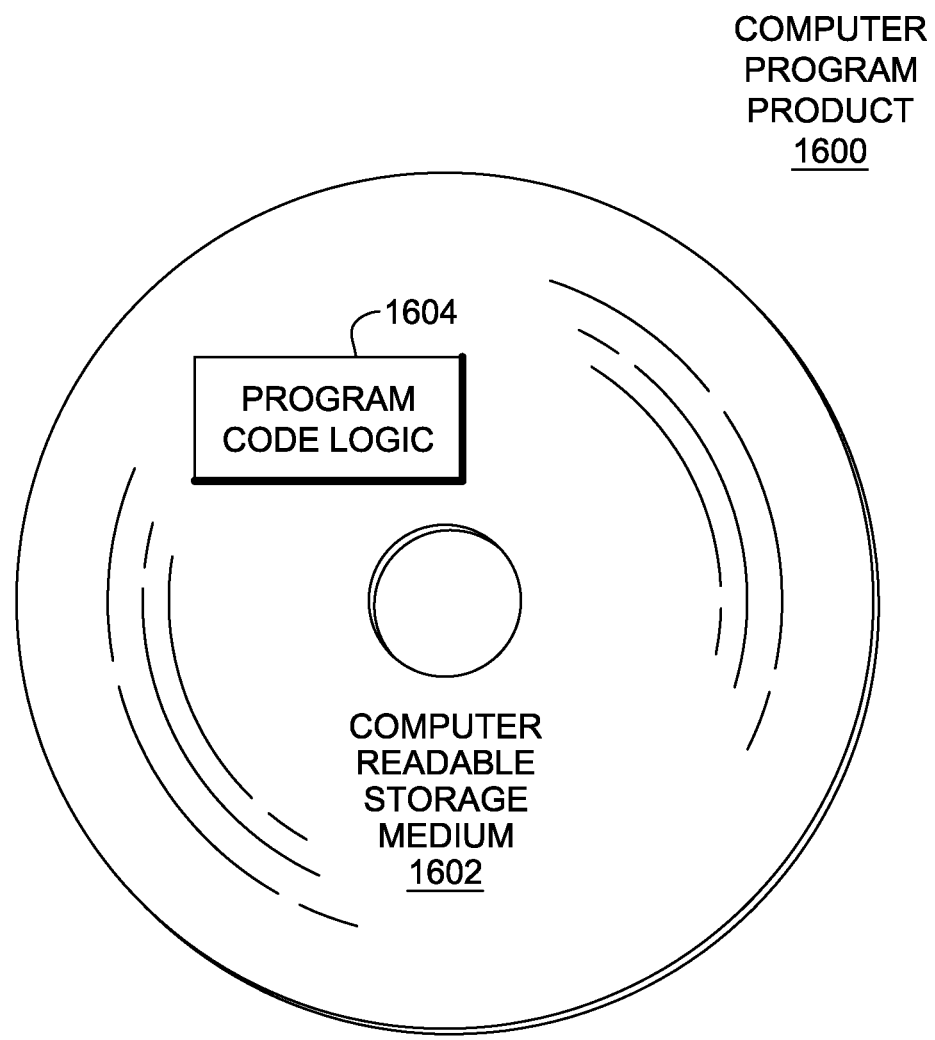
FIG. 16 depicts one embodiment of a computer program product incorporating one or more aspects of the present invention.

Referring now to FIG. 16, in one example, a computer program product 900 includes, for instance, one or more computer readable storage media 1602 to store computer readable program code means or logic 1604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than System z® servers, such as Power Systems servers or other servers offered by International Business Machines Corporation, or servers of other companies can include, use and/or benefit from one or more aspects of the present invention. Further, although in the example herein, the adapters and PCI hub are considered a part of the server, in other embodiments, they do not have to necessarily be considered a part of the server, but can simply be considered as being coupled to system memory and/or other components of a computing environment. The computing environment need not be a server. Further, although tables are described, any data structure can be used and the term table is to include all such data structures. Yet further, although the adapters are PCI based, one or more aspects of the present invention are usable with other adapters or other I/O components. Adapter and PCI adapter are just examples. Moreover, the device table entries, function table entries and/or other data structures may include more, less or different information than described herein. Further, although instructions are described herein to set certain bits, in other embodiments, instructions may not be used. Instead, the bits are set without using an instruction. Many other variations are possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 17:
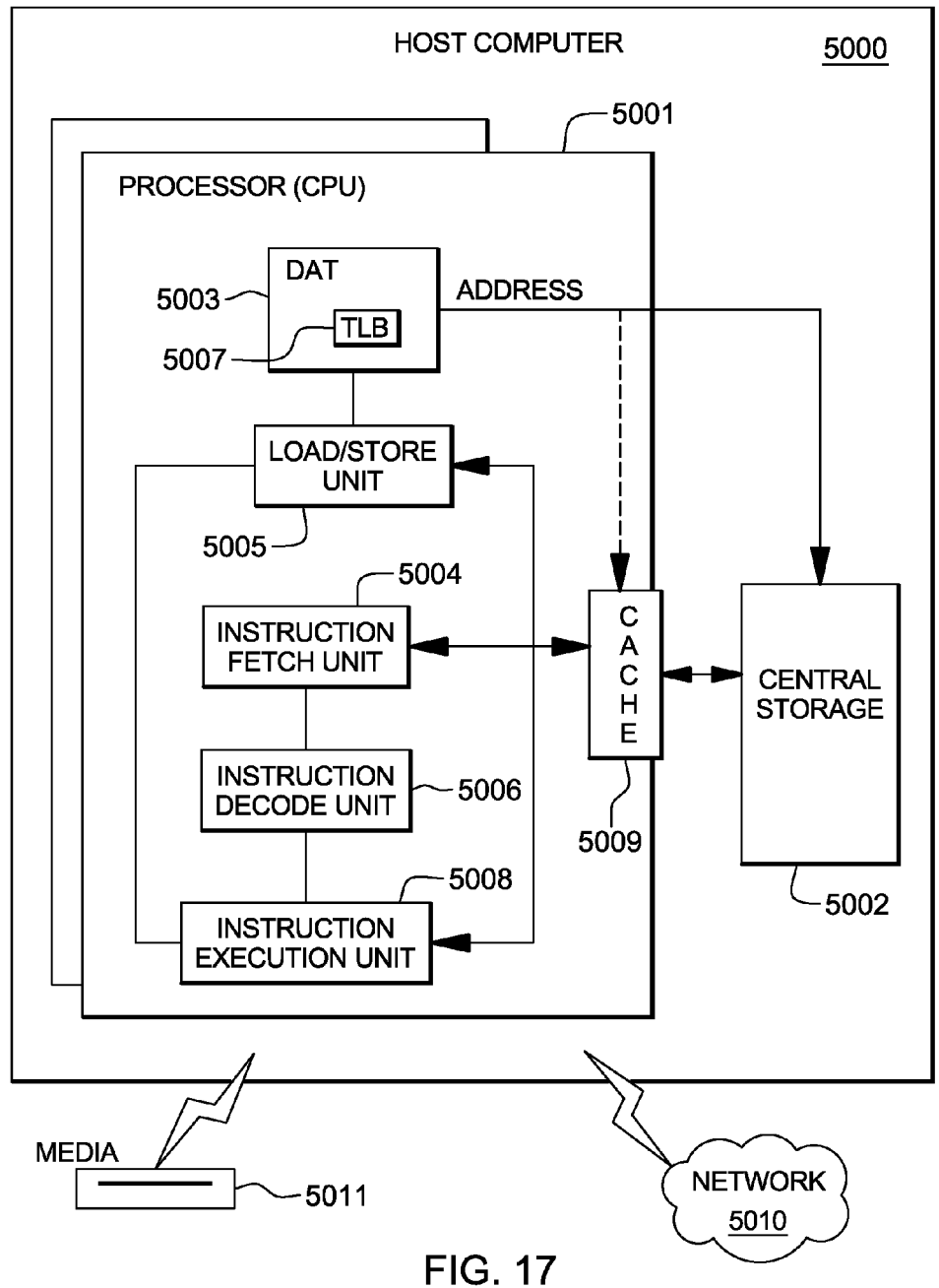
FIG. 17 depicts one embodiment of a host computer system to incorporate and use one or more aspects of the present invention.

Referring to FIG. 17, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture®). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 17, software program code which embodies the present invention is typically accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 18:
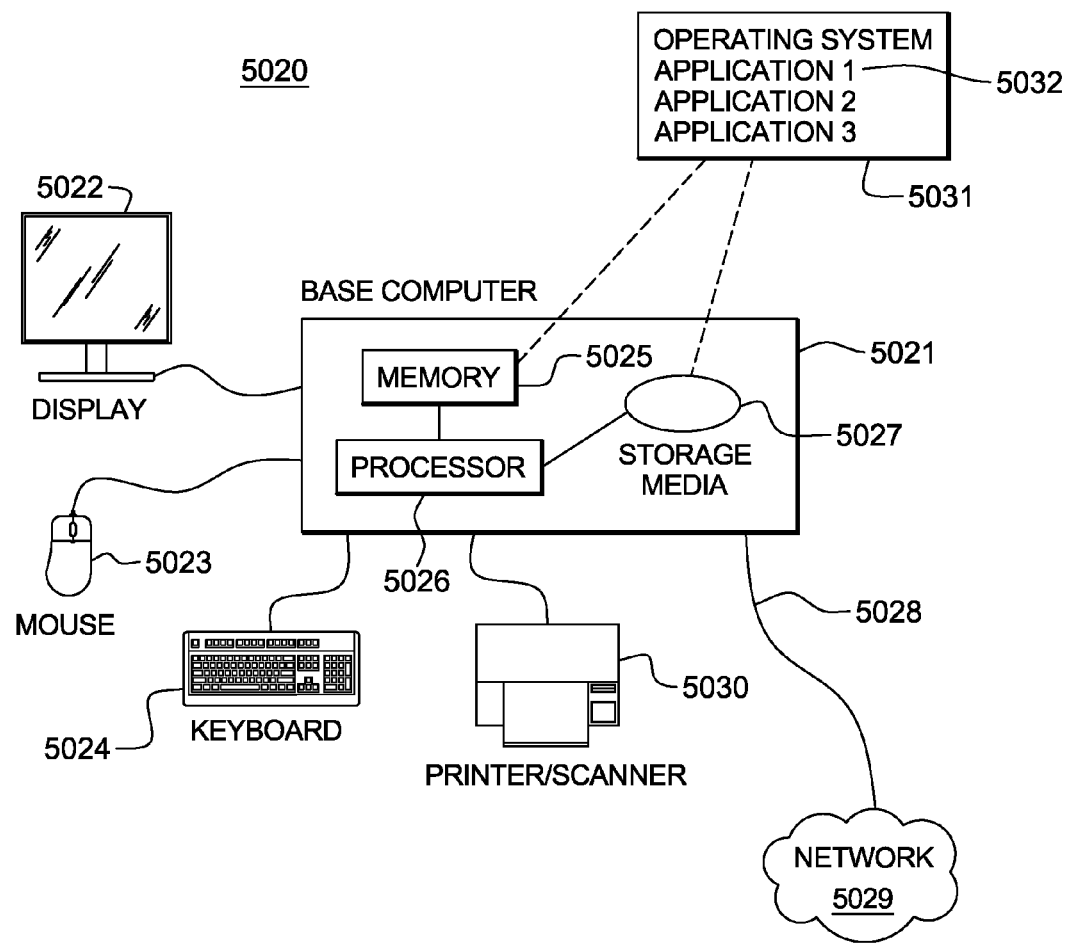
FIG. 18 depicts a further example of a computer system to incorporate and use one or more aspects of the present invention.

FIG. 18 illustrates a representative workstation or server hardware system in which the present invention may be practiced. The system 5020 of FIG. 18 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 19:
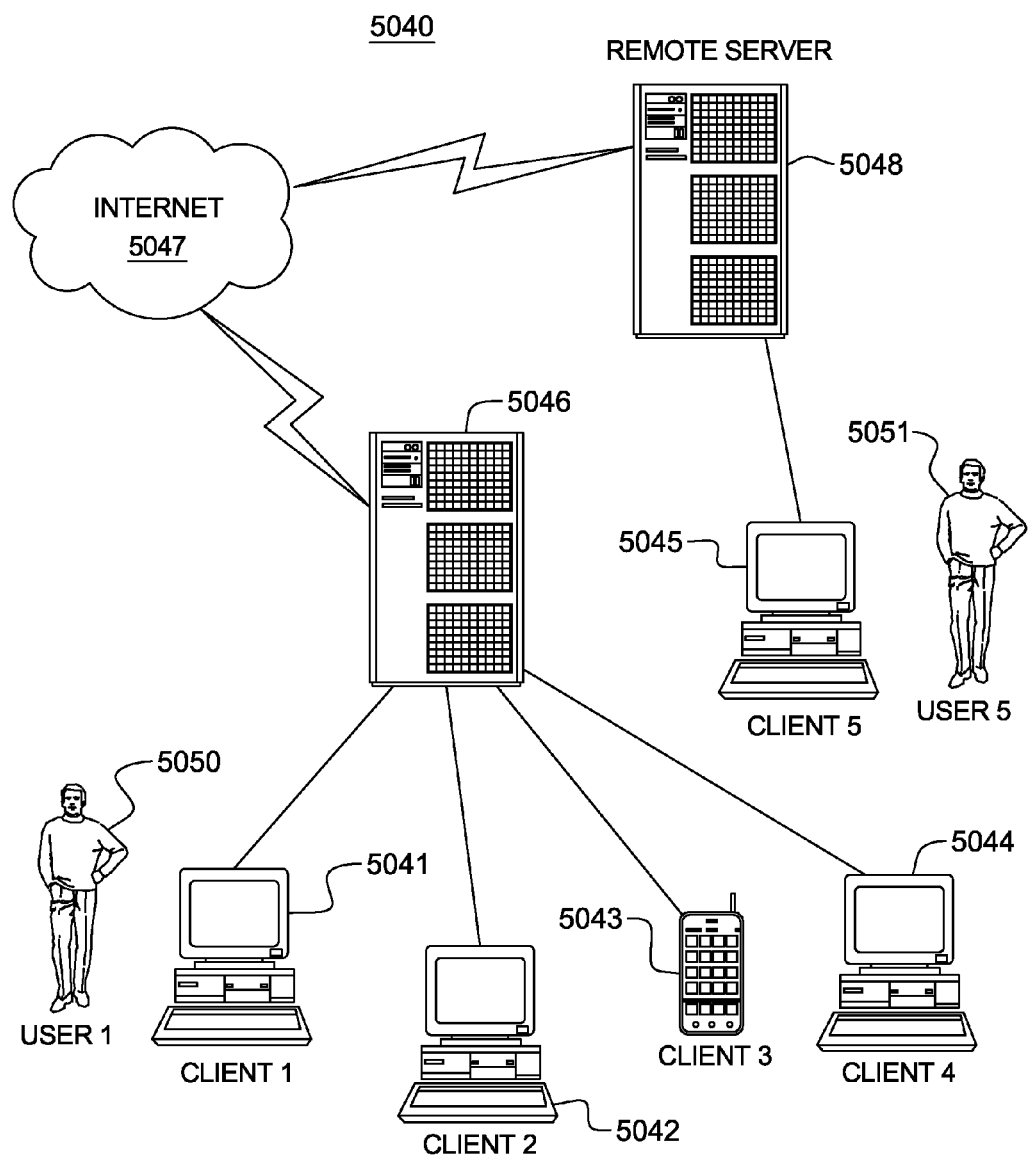
FIG. 19 depicts another example of a computer system comprising a computer network to incorporate and use one or more aspects of the present invention.

FIG. 19 illustrates a data processing network 5040 in which the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 19, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 18 and FIG. 19, software programming code which may embody the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 20:
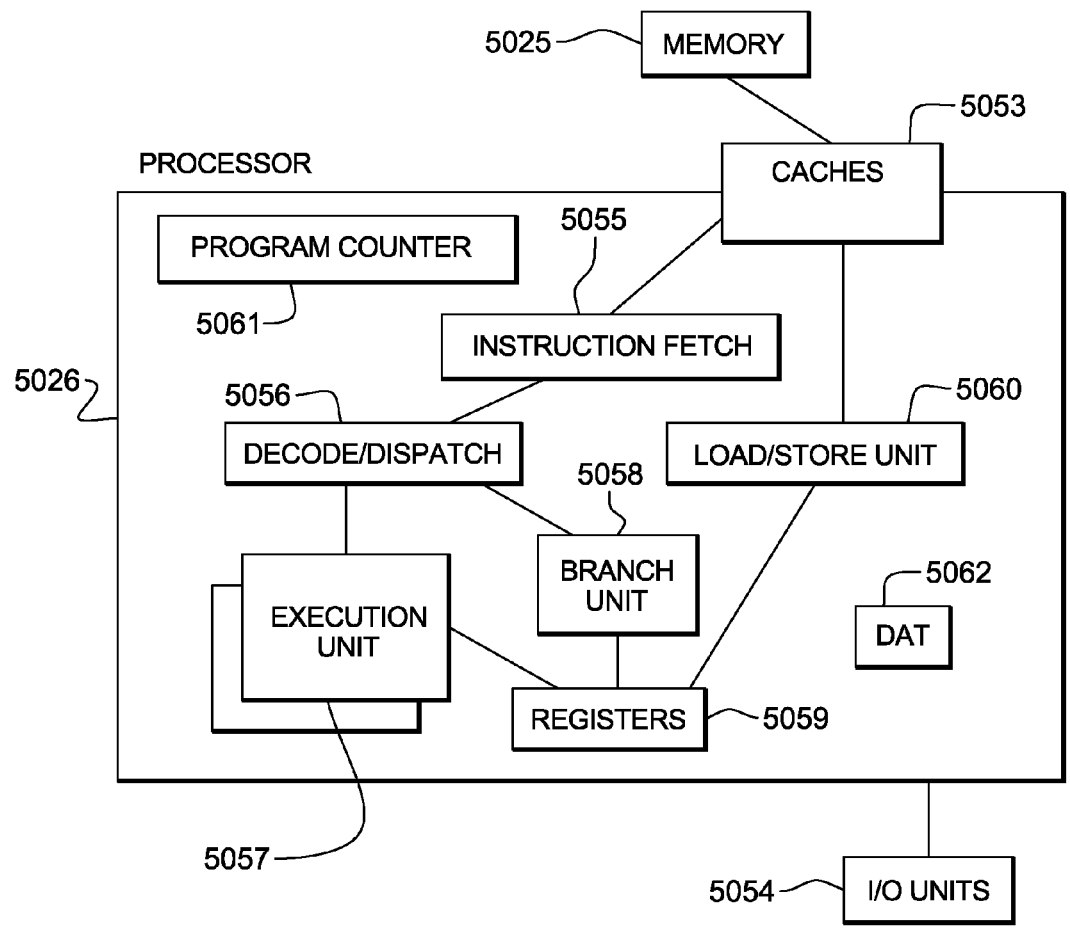
FIG. 20 depicts one embodiment of various elements of a computer system to incorporate and use one or more aspects of the present invention.

Referring to FIG. 20, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 21A:
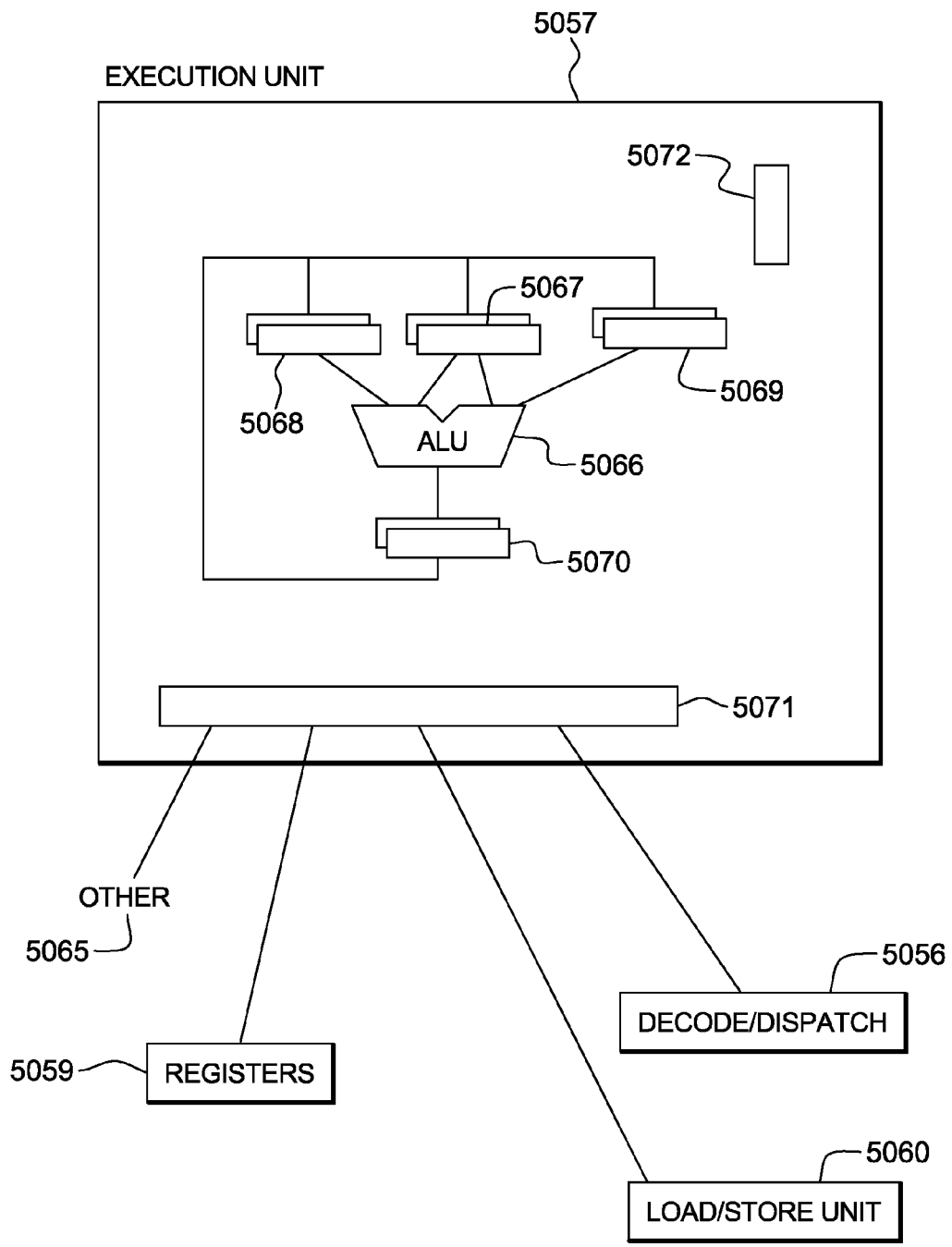
FIG. 21A depicts one embodiment of the execution unit of the computer system of FIG. 20 to incorporate and use one or more aspects of the present invention.

A processor 5026 typically has one or more units 5057, 5058, 5060 for executing the function of the instruction. Referring to FIG. 21A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 21B:
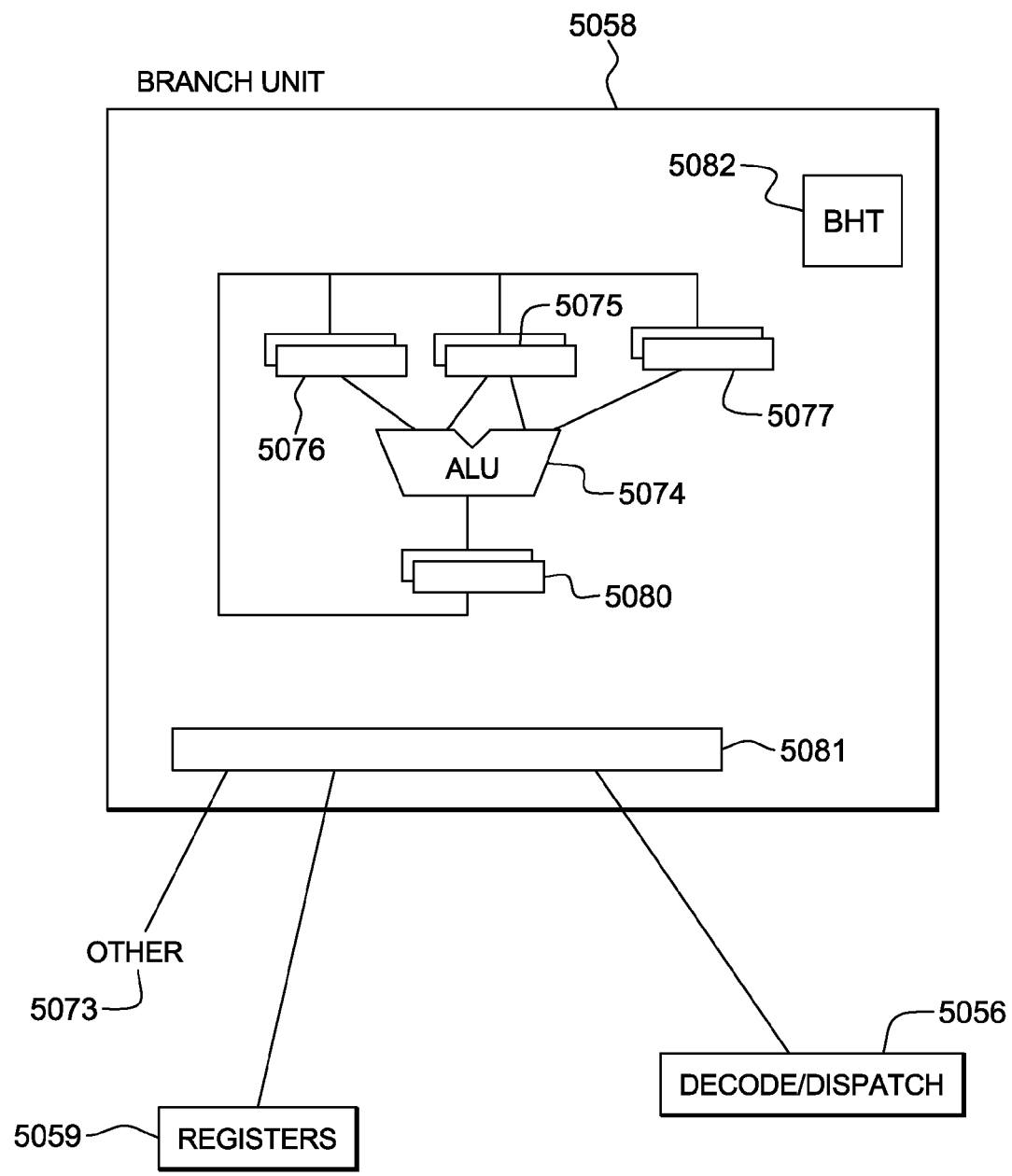
FIG. 21B depicts one embodiment of the branch unit of the computer system of FIG. 20 to incorporate and use one or more aspects of the present invention.

Referring to FIG. 21B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 21C:
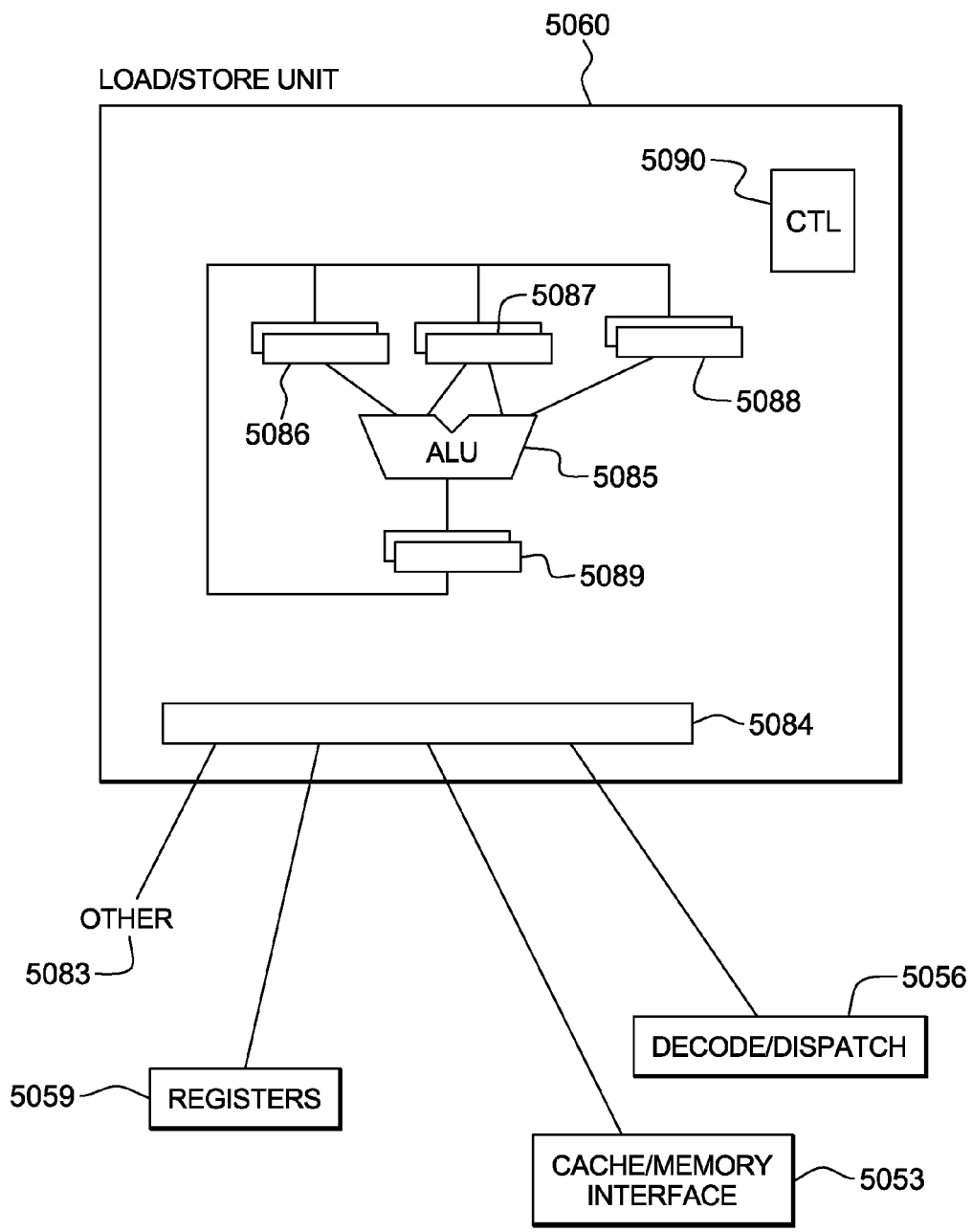
FIG. 21C depicts one embodiment of the load/store unit of the computer system of FIG. 20 to incorporate and use one or more aspects of the present invention.

Referring to FIG. 21C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multiprocessor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 20) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 22:
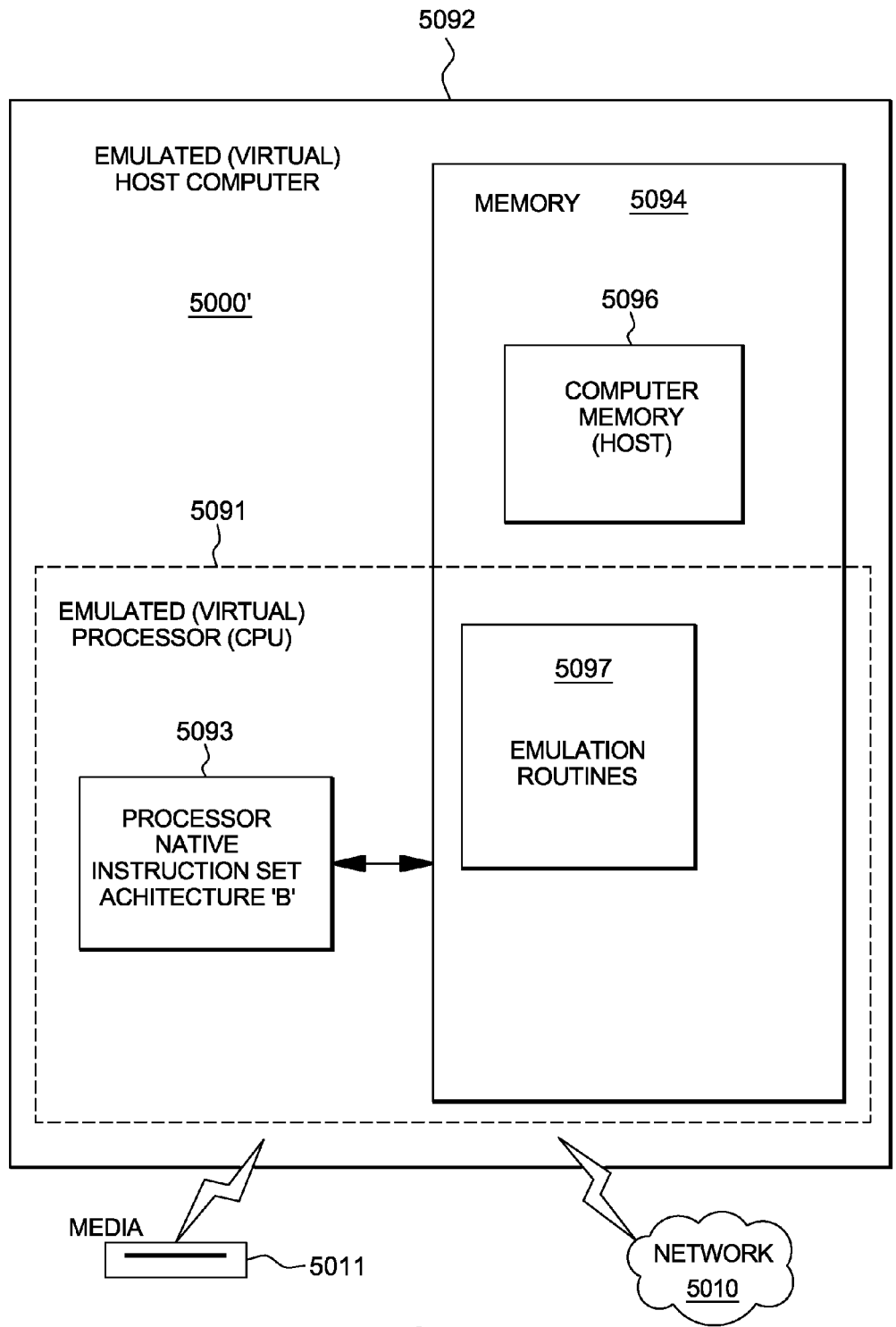
FIG. 22 depicts one embodiment of an emulated host computer system to incorporate and use one or more aspects of the present invention.

In FIG. 22, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

The invention claimed is:

1. A computer program product for controlling interrupt processing in a computing environment, the computer program product comprising:
a non-transitory computer readable storage medium readable by a processing circuit and storing instructions for execution by the processing circuit for performing a method comprising:
determining that a CPU-facing pending indicator has been set indicating an interrupt request by an adapter of the computing environment;
presenting the interrupt request to a selected operating system, the selected operating system to process one or more set event indicators corresponding to the interrupt request and one or more other set event indicators corresponding to one or more other interrupt requests;
resetting, based on the presenting, the CPU-facing pending indicator indicating to one or more processors that an interrupt request is not pending, wherein a hub-facing pending indicator remains set to indicate to a hub an interrupt is already presented and to suppress other interrupt requests from being made pending;
resetting the hub-facing pending indicator, based on a change in a control mode to allow another interrupt request to be made pending, the change in control mode based on a determination that event notifications are arriving at a rate faster than can be currently handled and that another interrupt request is to be presented allowing at least one other processor to process set event indicators;
determining that the CPU-facing pending indicator has been set indicating another interrupt request has been made pending; and
presenting the another interrupt request to one operating system of one or more operating systems.

2. The computer program product of claim 1, wherein the one or more set event indicators comprise one or more adapter event indicators set in an adapter interruption vector accessible to the selected operating system, the adapter interruption vector corresponding to the adapter and included in an array of one or more adapter interruption vectors accessible to the selected operating system.

3. The computer program product of claim 1, wherein the CPU-facing pending indicator is set indicating another interrupt request, based on the selected operating system determining that a rate at which interrupt indicators are being set to be processed by the selected operating system exceeds a defined value or event indicators to be processed have been processed.

4. The computer program product of claim 3, wherein the CPU-facing pending indicator is set based on an instruction issued by the selected operating system resetting the hub-facing pending indicator and based on the another interrupt request being issued by the adapter resulting in the setting of the hub-facing pending indicator reset by the instruction.

5. The computer program product of claim 4, wherein the method further comprises:
receiving by a hub coupled to the adapter the another interrupt request; and
based on receiving the interrupt request, setting the CPU-facing pending indicator and the hub-facing pending indicator.

6. The computer program product of claim 1, wherein an interruptions mode for the adapter as set by the selected operating system is a single interruption mode, and wherein the presenting the interrupt request automatically changes the interruptions mode to a no interruptions mode, the no interruptions mode resulting in the resetting of the CPU-facing pending indicator.

7. The computer program product of claim 6, wherein the interruptions mode is set for an interruption subclass and applies to a plurality of processors, and wherein the adapter is included in the interruptions subclass.

8. The computer program product of claim 7, wherein the interruption subclass exclusively includes one type of adapter, and wherein the interruptions mode is set for that type of adapter.

9. The computer program product of claim 1, wherein the selected operating system is a guest operating system and the CPU-facing pending indicator and the hub-facing pending indicator are stored in a guest interruption state area in host memory.

10. A computer program product of controlling interrupt processing in a computing environment, the computer program product comprising:
a non-transitory computer readable storage medium readable by a processing circuit and storing instructions for execution by the processing circuit for performing a method comprising:
presenting an interrupt request by an adapter of the computing environment to an operating system, the operating system to process one or more set event indicators corresponding to the interrupt request, and wherein an interruptions mode set for the adapter is a single interruptions mode; and
based on the presenting, automatically changing the interruptions mode set for the adapter to a no interruptions mode, wherein another interrupt request is not presented to the operating system but event indicators for one or more other interrupt requests are set to be processed by the operating system.

11. The computer program product of claim 10, wherein the method further comprises changing the interruptions mode back to the single interruption mode, based on a determination that other interrupt requests are not being processed timely.

12. A computer system for controlling interrupt processing in a computing environment, the computer system comprising:
- a memory; and
- a processor in communications with the memory, wherein the computer system is configured to perform a method, said method comprising:
    - determining that a CPU-facing pending indicator has been set indicating an interrupt request by an adapter of the computing environment;
    - presenting the interrupt request to a selected operating system, the selected operating system to process one or more set event indicators corresponding to the interrupt request and one or more other set event indicators corresponding to one or more other interrupt requests;
    - resetting, in response to the presenting, the CPU-facing pending indicator indicating to one or more processors that an interrupt request is not pending, wherein a hub-facing pending indicator remains set to indicate to a hub an interrupt is already presented and to suppress other interrupt requests from being made pending;
    - resetting the hub-facing pending indicator, based on a change in a control mode to allow another interrupt request to be made pending, the change in control mode based on a determination that event notifications are arriving at a rate faster than can be currently handled and that another interrupt request is to be presented allowing at least one other processor to process set event indicators;
    - determining that the CPU-facing pending indicator has been set indicating another interrupt request has been made pending; and
    - presenting the another interrupt request to one operating system of one or more operating systems.

13. The computer system of claim 12, wherein the one or more set event indicators comprise one or more adapter event indicators set in an adapter interruption vector accessible to the selected operating system, the adapter interruption vector corresponding to the adapter and included in an array of one or more adapter interruption vectors accessible to the selected operating system.

14. The computer system of claim 12, wherein the CPU-facing pending indicator is set indicating another interrupt request based on the selected operating system determining that a rate at which interrupt indicators are being set to be processed by the selected operating system exceeds a defined value or event indicators to be processed have been processed.

15. The computer system of claim 14, wherein the CPU-facing pending indicator is set based on an instruction issued by the selected operating system resetting the hub-facing pending indicator and based on the another interrupt request being issued by the adapter resulting in the setting of the hub-facing pending indicator reset by the instruction.

16. The computer system of claim 15, wherein the method further comprises:
- receiving by a hub coupled to the adapter the another interrupt request; and
- based on receiving the interrupt request, setting the CPU-facing pending indicator and the hub-facing pending indicator.

17. The computer system of claim 12, wherein an interruptions mode for the adapter as set by the selected operating system is a single interruption mode, and wherein the presenting the interrupt request automatically changes the interruptions mode to a no interruptions mode, the no interruptions mode resulting in the resetting of the CPU-facing pending indicator.

18. The computer system of claim 12, wherein the selected operating system is a guest operating system and the CPU-facing pending indicator and the hub-facing pending indicator are stored in a guest interruption state area in host memory.

19. A method of controlling interrupt processing in a computing environment, the method comprising:
- determining, by a processor of the computing environment, that a CPU-facing pending indicator has been set indicating an interrupt request by an adapter of the computing environment;
- presenting, by the processor, the interrupt request to a selected operating system, the selected operating system to process one or more set event indicators corresponding to the interrupt request and one or more other set event indicators corresponding to one or more other interrupt requests;
- resetting, based on the presenting, the CPU-facing pending indicator indicating to one or more processors that an interrupt request is not pending, wherein a hub-facing pending indicator remains set to indicate to a hub an interrupt is already presented and to suppress other interrupt requests from being made pending;
- resetting the hub-facing pending indicator, based on a change in a control mode to allow another interrupt request to be made pending, the change in control mode based on a determination that event notifications are arriving at a rate faster than can be currently handled and that another interrupt request is to be presented allowing at least one other processor to process set event indicators;
- determining, by the processor or another processor, that the CPU-facing pending indicator has been set indicating another interrupt request was made pending; and
- presenting, by the processor or another processor, the another interrupt request to one operating system of one or more operating systems.

20. The method of claim 19, wherein the CPU-facing pending indicator is set indicating another interrupt request based on the selected operating system determining that a rate at which interrupt indicators are being set to be processed by the selected operating system exceeds a defined value or event indicators to be processed have been processed.

21. The method of claim 19, wherein an interruptions mode for the adapter as set by the operating selected system is a single interruption mode, and wherein the presenting the interrupt request automatically changes the interruptions mode to a no interruptions mode, the no interruptions mode resulting in the resetting of the CPU-facing pending indicator.

* * * * *